(12) United States Patent
Ferguson

(10) Patent No.: US 7,189,342 B2
(45) Date of Patent: Mar. 13, 2007

(54) TAPECAST ELECTRO-CONDUCTIVE CERMETS FOR HIGH TEMPERATURE RESISTIVE HEATING SYSTEMS

(75) Inventor: Lucian G. Ferguson, Seattle, WA (US)

(73) Assignee: Harmonics, Inc., Seattle, WA (US)

(*) Notice: Subject to any disclaimer, the term of this patent is extended or adjusted under 35 U.S.C. 154(b) by 554 days.

(21) Appl. No.: 10/435,398

(22) Filed: May 9, 2003

(65) Prior Publication Data

US 2003/0209534 A1    Nov. 13, 2003

Related U.S. Application Data

(60) Provisional application No. 60/379,430, filed on May 9, 2002.

(51) Int. Cl.
H01B 1/02 (2006.01)
H01B 1/18 (2006.01)

(52) U.S. Cl. .............. 252/512; 252/516; 252/521.3; 252/521.4

(58) Field of Classification Search .............. 252/512, 252/516, 521.4, 521.3; 501/96.3, 153, 133
See application file for complete search history.

(56) References Cited

U.S. PATENT DOCUMENTS

| | | |
|---|---|---|
| 5,252,809 A | 10/1993 | Denim |
| 5,420,399 A | 5/1995 | Sekhar et al. |
| 5,514,630 A | 5/1996 | Wilkens et al. |
| 5,550,526 A | 8/1996 | Mottahed |
| 5,565,387 A | 10/1996 | Sekhar et al. |
| 5,616,266 A | 4/1997 | Cooper |
| 5,881,208 A | 3/1999 | Geyling et al. |
| 6,284,525 B1 | 9/2001 | Manthies et al. |
| 6,337,212 B1 | 1/2002 | Nagle et al. |
| 6,341,954 B1 | 1/2002 | Godwin et al. |

*Primary Examiner*—Mark Kopec
(74) *Attorney, Agent, or Firm*—Steptoe & Johnson LLP

(57) ABSTRACT

This invention relates to novel chemical compositions and manufacturing methods for producing electro-conductive, metal-ceramic materials having improved structural stability to operate at high temperatures in oxidizing atmospheres.

11 Claims, 8 Drawing Sheets

```
┌─────────────────────────────────────────────────────────────┐
│ Reacting a mixture of polyvinyl alcohol pretreated boron    │
│ oxide-silicon dioxide composition with a metal composition, │
│ and a filler material having at least one carbide, boride,  │
│ or silicide                                            704  │
└─────────────────────────────────────────────────────────────┘
                              │
                              ▼
┌─────────────────────────────────────────────────────────────┐
│ Dispersing the metal composition into a non-acqueous solvent│
│ to form a slurry                                       708  │
└─────────────────────────────────────────────────────────────┘
                              │
                              ▼
┌─────────────────────────────────────────────────────────────┐
│ Forming the slurry into tapecast sheets                712  │
└─────────────────────────────────────────────────────────────┘
                              │
                              ▼
┌─────────────────────────────────────────────────────────────┐
│ Assembling a "green" or pre-fired laminate onto a structure,│
│ the laminate configured to have electroresistive and        │
│ electroconductive regions.                             718  │
└─────────────────────────────────────────────────────────────┘
                              │
                              ▼
┌─────────────────────────────────────────────────────────────┐
│ Firing the "green" laminate onto the structure         782  │
└─────────────────────────────────────────────────────────────┘
                              │
                              ▼
┌─────────────────────────────────────────────────────────────┐
│ Attaching electrical conductors to the fired laminate. 786  │
└─────────────────────────────────────────────────────────────┘
```

Fig. 7

TAPECAST ELECTRO-CONDUCTIVE CERMETS FOR HIGH TEMPERATURE RESISTIVE HEATING SYSTEMS

PRIORITY CLAIM

This invention claims priority to U.S. provisional patent application Ser. No. 60/379,430, filed 9 May 2002, herein incorporated by reference.

FIELD OF THE INVENTION

This invention relates generally to chemical compositions for producing electro-conductive, metal-ceramic (cermet) materials and, more specifically, to the composition, formation and use of cermet materials as resistive heating elements.

BACKGROUND OF THE INVENTION

Conventional heating elements are made from three traditional groups of materials comprised of (1) refractory metals like Mo and W; (2) resistance heating alloys including Fe—Cr—Al (Kanthal) and Ni—Cr (nichrome); and (3) high temperature, electrically conductive metal carbides and silicides including SiC and $MoSi_2$.

Many devices employ metal-based resistive heater elements. These metallic films, foils, and filaments are formed or deposited with a variety of conventional techniques that include wire drawing, screen printing of inks, pastes and slurries, sputtering, electron beam deposition, physical vapor deposition (PVD), chemical vapor deposition (CVD), and arc plasma (flame) spraying.

U.S. Pat. No. 5,881,208 by Geyling, et al., discloses an apparatus for rapid thermal processing (RTP) of silicon wafers. The apparatus may include a heating element, sensing element and a cooling element, all of which are positioned in opposing relation to a backside of a silicon wafer. The heater element may be, for example, a resistance heating element with a CVD coating of pyrolytic graphite on a pyrolytic boron-nitride (PBN) substrate, such as the Boralectric line of heaters available from Advanced Ceramics Corporation. Metallic conductor layers may also be deposited by patterned CVD. The graphite is then machined to form a serpentine pattern that is then used as a resistive heating element. One serious disadvantage with CVD and chemical vapor infiltration techniques is that they frequently rely on the use of extremely toxic and explosive vapors such as silanes (methyl trichlorosilane) and hydrogen gas in low-pressure vacuum deposition chambers. Another significant disadvantage is that deposition rates are relatively slow, and thicker films will require excessively long times to fabricate using typical CVD processes. The operational and safety precautions that must be used with CVD techniques are often very expensive, time consuming and cumbersome.

Various methods for producing lithographically defined heating elements are commonly practiced and known to those skilled in the art. Development of thin film materials conventionally involves subjecting Si wafers or other substrates to a sequence of deposition, lithographic, and post deposition process steps. Process sequences are constrained and limited by the lowest maximum temperature tolerance of any other device or layer on the substrate being processed. Process steps involve mounting the sample in a chamber with controlled environments and successive runs through cycles that include high vacuum, e-beam, furnace treatments, sputtering, chemical vapor deposition (CVD), ion milling, and so on. R. E. Cavicchi, et al., "Pulsed desorption kinetics using micromachined microhotplate arrays", J. Vac. Sci. Technol. A, vol. 12, p. 2549, 1994 and others have developed Si-based micro-machining techniques for fabricating "micro-hotplates" that may be useful as gas sensors and components in micro-chemical reactors or "lab-on-a-chip-devices", (see for example "Miniature reaction chamber and devices incorporating same", U.S. Pat. No. 6,284,525 by Mathies, et al., and U.S. Pat. No. 6,337,212 by Nagle, et al.) The maximum operating temperature of micro-heaters fabricated from refractory metals such as tungsten (W) appears to be about 800 C in non-oxidizing environments (usually accomplished by coating or burying the heating element in an inert layer). Aluminum micro-hotplates can be operated at temperatures up to about 500 C.

While it is possible to create small (<100 micrometers), fast reacting heating elements with micro-machining techniques, it is also well known that these processes are time and labor-intensive, and require very large capital and operational expenditures. In general, widespread usage has been limited by the cost of complicated micro-fabrication processes, use temperature restrictions, and wet chemical processing requirements.

U.S. Pat. No. 6,341,954 by Godwin, et al., discloses a molding system using film heaters and sensors. Preferably, the thin film element comprises a thin film heater in direct contact with the molten resin and is positioned to aid in the heat and flow management of the resin within the melt channel. Tungsten, molybdenum, gold, platinum, copper, TiC, TiCN, TiAlN, CrN, palladium, iridium, silver, and conductive inks are the recommended materials for resistive heating films. Ion plating, sputtering, chemical vapor deposition (CVD), physical vapor deposition (PVD), and flame spraying are recommended as deposition technologies for fabricating the heating films. Heating requirements (or watt densities) are in the range of 6.2–12.4 $W/cm^2$.

U.S. Pat. No. 5,616,266 by Cooper describes methods and compositions for constructing thin film electrically conductive resistance heating elements. According to the teaching of this patent, vapor deposition of an area thin film in the form of a tin oxide film of about 3000 to 5000 angstroms is most preferred, however other film thickness and materials can be employed, as are well known in the industry and set forth in the patents. When operating under air-radiant conditions, as in an oven application, the substrate and film have an area sufficiently large to cause the heating element to operate at a power density of less than about 1.55 $W/cm^2$ at the maximum operating temperature of the heating element, however it is claimed higher watt densities (up to 23.25 $W/cm^2$ maximum) can be attained when liquids or gases flowing inside a tubular substrate absorb heat from the substrate. Tubular shaped elements have the added complications and expense of requiring apparatus to rotate the element during deposition or sputtering of the conductive material onto the tubular substrate.

"Thick" and "thin" film resistive heating elements have many inherent disadvantages that generally limit their usefulness and applicability. One problem with the film deposition processes is that voids or pinholes can be formed in the film materials during sequential deposition or printing and firing steps. Another more serious disadvantage is that the requirement for building up many multiple film layers in order to create more durable or complex element features results in an expensive process due to the increased time and number of individual process steps that are involved. (For example, the recommended process for building up thick film heating elements typically involves multiple applications of an underglaze, fabrication of a print screen, application of an emulsion to the print screen, coating the print screen with a metallic thick film ink, multiple printing, controlled drying and firing steps that require precise alignment to build up the thickness of the resistive heating film, followed by printing, drying and firing on low resistivity silver contact layers, often followed by printing, drying and firing on protective insulating overglaze layers.) Yet another common problem with "thick" and "thin" film heating elements is that they allow only a relatively low surface-specific heating power (usually less than 2.34–3.10 W/cm$^2$), and only relatively low radiant surface temperatures (usually less than 500–600 C maximum). Typically, the film must be thin enough to insure "molecular bonding" with the substrate.

Techniques that involve painting, spraying and particularly screen printing metallic conductors in the form of a paste or ink onto a substrate are also in widespread use. One manufacturer, Dupont Electronic Materials, produces screen printable conductive inks under the trade name of Heatel® that are designed for the fabrication of thick film resistive heating elements. Thick films with an emulsion build-up of about 10–12 micrometers and print speeds of 100 to 150 mm/sec. are possible. The printed films must be dried and then sintered at a maximum temperature of about 850 C for about 30 minutes. In one application, the printed "thick film" Heatel® heating elements have been used to replace traditional (nichrome wire) resistance coils in appliances such as electric kettles, and are said to offer fast-boil capability. Another manufacturer, Electro-Science Laboratories, produces a screen printable silver palladium conductor with a firing range between 625 C and 930 C. The emulsion thickness is about 25 micrometers with a −325 mesh screen, and the fired thickness of the film is about 12 micrometers. The paste has a shelf life of only 6 months, and the resistivity is in the range of about 2 to 8 milliohms/square.

A particular disadvantage of printable conductors in the form pastes and inks is that the materials tend to be very expensive. Metallization systems such as Pd/Ag, that are most commonly used to print resistive heating films can cost $500.00 or more for quantities as small as 50 grams, making anything but relatively thin films (that is less than about 50 micrometers) impractical from the cost standpoint alone. Most Conductive pastes and inks will also contain many volatile solvents and other environmentally undesirable constituents that are used to adjust the rheology of the paste. Conductive pastes and inks that are frequently used for resistive heating applications at lower temperatures (about 300–500 C maximum) are Pd/Ag, Pt/Ag, Pt/Au, and Pt. A disadvantage inherent with screen printable inks and pastes is that they often require multiple print, dry, and sinter cycles to build-up sufficient thickness for applications that require higher power and heat transfer capabilities. These disadvantageous multiple cycles increase the manufacturing costs. In order to be compatible with Low-temperature Co-fired Ceramic tape (LTCC) systems these low-temperature conductive inks and pastes are designed to be fired at temperatures of no more than about 850 C. Conductive pastes and inks must be carefully formulated and adjusted in order to match the thermal expansion coefficient (TCE) of the substrate, and the large shrinkage rates in the case of co-fired (LTCC) ceramic systems. Much effort has been directed at solving problems with the TCE mismatch and shrinkage that can result in poor adhesion, buckling and warping of metallic "thick" and "thin" films on various substrates.

Several U.S. patents, U.S. Pat. No. 5,550,526 by Mottahed for example, describe techniques for forming recesses or cavities in multilayer devices that serve to thermally isolate radiating or heating elements. For example, the substrate beneath the isolating layer is generally etched away so that a suspended membrane is formed upon which the heater element is located, thereby increasing the thermal isolation of the heater element, which results in a significant decrease in power consumption. This is important for portable sensing instruments which are reliant on battery power. Thermal isolation profoundly effects the response times, power consumption and efficiency of heaters and thermally radiating elements.

As is well known to those skilled in the art, one of the most challenging and persistent problems with "green" or pre-fused ceramic tapes and multilayer lamination technologies has been devising practical methods to successfully eliminate slumping or deformation of suspended or laminated structures during the high temperature sintering process. The sagging or slumping problem is particularly exacerbated as the length of the suspended laminate increases, (see for example H. Bau, et al., Ceramic Tape-Based Meso Systems Technology, Proceedings of the ASME International Mechanical Engineering Congress and Exposition, Anaheim, Calif. 1998). Also, serious deformation can occur when stacks of green ceramic tapes are laminated under even relatively low pressures to form monoliths containing structures like channels or cavities, particularly when these structures have high aspect ratios. The three main strategies commonly used to control sagging are (1) the deposition of thick films to exert tensile forces on the bridging layer, (2) the use of sacrificial materials (lead bi-silicate glass frit), and (3) the use of fugitive pastes (graphitic carbon black paste), (see for example P. Espinoza-Vallejos, et al., The Measurement and Control of Sagging in Meso Electromechanical LTCC Structures and Systems", MRS Conference Proceedings, Vol. 518, 1998). All of the previously developed anti-sagging techniques appear to be limited in their usefulness and success. For example, the tensile force that the bridging thick film exerts must be carefully balanced with the force that is inducing the sagging of the suspended layer, and the extra complication of depositing a thick film adds time, and expense to the process. Also, lead bi-silicate frits and other sacrificial materials often leave a residue that requires etching in hydrofluoric acid (HF) or other undesirable processes that may damage structures to remove the residue. Finally, the fugitive carbon pastes and most other solvent-based pastes are susceptible to drying, shrinking, cracking or deforming, multiple pastes layers are desired to build up sufficient thickness for many applications, and the pastes are inconvenient to apply in a rapid precise manner, all of which increases the desired time, labor and overall fabrication costs.

Many important resistive heater applications exist for materials that can operate at temperatures greater than about 500 C in air or corrosive atmospheres for prolonged times. Under some circumstances it may be possible to deposit thick films of refractory metals such as W, Mo, Ta, Pt and Pd deposited on high-temperature ceramic materials such as aluminum oxide or zirconium oxide, however nearly all metals (including W, Mo, and Ta) are unsuitable for use in air or corrosive atmospheres because they degrade rapidly (oxidize or corrode) at higher temperatures, and the inert Pt group metals (Pt, Ir, Rh, Re, Pd) are all prohibitively expensive. Another major disadvantage that is common to nearly all metal-based heating elements (including platinum group metals) is that the intrinsic bulk resistivity of metals is far too low, (usually less than 1 milliohm·cm), to achieve high power densities and surface temperatures. Due to the low intrinsic resistivity of most metals, the resistive heater designer is forced to use very thin, long meandering films or filaments in order to increase the resistance of the element. Unfortunately, the durability and power handling capability decrease rapidly as the cross sectional area of the metallic conductor decreases, and defects (such as a void or variations in the thickness) become more critical. Oxidized metals tend to be brittle, and the oxidized layer may not be adherent to the underlying material, leading to mechanical failure. Also transient electrical current surges, overvoltages, and hot spots can easily develop that lead to melting of metallic elements, as is well known in the resistive heating industries.

An ever growing need for higher process temperatures and better performance in oxidizing or hostile environments has led to the development of non-metallic resistive heating materials. In particular, SiC, $MoSi_2$ and certain other non-oxide ceramic materials in the carbide, silicide, and boride groups have proven to be effective as high-temperature (>1200 C) resistive heating elements. With the addition of dopants and insulating filler materials, a much wider range of resistivities can be achieved with electro-conductive metal-carbides and silicides such as SiC or $MoSi_2$, and this allows for higher power densities with greater reliability.

A number of prior patents discuss methods for producing hot-pressed, SiC or $MoSi_2$-based, electro-conductive ceramic heating elements. For example, U.S. Pat. No. 5,514,630 by Wilkens, et al., discloses ceramic resistance igniters that are useful as compact radiant energy sources for replacing pilot lights in liquid and gas fuel burning appliances. Ceramic powder blends consisting primarily of $MoSi_2$, SiC, $Al_2O_3$, and AlN are loaded into a hot press and hot pressed to form a billet of about 60% theoretical density. The billet is then green machined to form tiles that are subsequently subjected to high temperature hot isostatic pressing (HIP) at 1790 C and 30,000 psi for 1 hour. After HIP the dense tiles are diamond machined to form a "hairpin" design igniter. The ceramic igniters are claimed to have sufficiently high resistivity (0.3 ohm·cm at 1300 C), a satisfactory time-to-temperature (4 seconds to 1100 C), and electro-thermally stability up to 132 Volts.

Unfortunately, the electro-conductive ceramic igniters tend to be mechanically fragile and fracture easily due to the fact that SiC (and nearly all other monolithic ceramic materials) are very brittle, and stress is concentrated at the sharp bends in the unsupported "hairpin" design of the igniters and heating elements. Although SiC, $MoSi_2$, and related carbide and silicide ceramics have many of the properties that make them near ideal for high temperature reisitive heating applications, they are difficult to process and it is impractical or nearly impossible to produce shapes that are more complex than simple cylinders and plates without expensive diamond machining and grinding operations. Dense ceramic carbides, borides and silicides typically require expensive or exotic process equipment including hot isostatic presses (HIP), capable of reaching temperatures of 1700 C and pressures of 30,000 psi or more under inert or evacuated atmospheres. The HIP process is energy intensive and time consuming, and is therefore not economical or practical for high volume production applications or where more complex shapes are desired.

U.S. Pat. No. 5,252,809 by Denim discloses a panel heating element that utilizes an electrically conductive heating layer applied laminarly to a non-conductive support element. The heating layer is applied in a pasty state and consists of powdered molybdenum borides ($MO_2B_5$, MoB, $Mo_2B$) and two different powdered types of glass and, preferably, an organic substance such as cyclohexanol, lanolin or petrolatum oil. According to the Denim patent, it is especially important that the first type of glass has a softening temperature not exceeding 700 C. Molybdenum boride in the panel heating element according to the invention is the material that gives the heating layer the electrical conductivity. Since the first type of glass begins to soften starting from 700 C the molybdenum boride is protected from an undesirable air supply. So that the first type of glass does not completely melt with increasing temperature, a protective skeleton is incorporated by the second type of glass. The heating layer, and optionally the insulating layers, are applied in pasty state by a silk screening process. Afterwards the heating layer, and optionally the insulating layers, are baked at a temperature of about 820 to 875 C. The authors claim that surface-specific heating powers of up to 13 $W/cm^2$ and a heating temperature of 800 C are possible according to the invention. Most known panel heating elements, including the Denim invention, provide a relatively low surface-specific heating power and only relatively low heating temperatures, and they are relatively expensive labor intensive processes that require multiple printing, drying, and sintering stages.

U.S. Pat. Nos. 5,565,387 and 5,420,399 by Sekhar, et al., disclose an electrical heating element and compositions for producing such heating elements using a method described as dieless micropyretic synthesis. The compositions include a filler material, a reactive system comprised of at least two particulate combustible materials capable of undergoing micropyretic synthesis, and (optionally) a plasticizer or extrusion agent. The filler materials specifically mentioned in the claims are SiC, $MoSi_2$, Fe, Cr, Al, Si, $Y_2O_3$, $Al_2O_3$, $SiO_2$, $ZrO_2$, MgO, $Si_3N_4$ and small amounts of B or BN(<1%). Filler materials are said to have three important effects on the products, (1) the filler materials tend to moderate the combustion process and may be used to impart properties not necessarily present in the combustion synthesized products, (2) they act as reinforcements in the final composition products, and (3) fillers may act as sintering aids. The Sekhar, et al., invention relies on micropyretic synthesis or Self-propagating High-temperature Synthesis (SHS) to make the desired product. At least two of the materials in the reactive (combustible) systems must be present in proportion to one another such that they will react exothermically and become self-sustaining when the composition is ignited at a temperature between 150 C and 1250 C.

The Sekhar invention discussed above, for example, does not appear to teach or suggest the use of a reactive system comprising Al and $B_2O_3$ reactive powders for the production of resistive heating elements, and is limited to reactive (combustible) systems that can sustain rapid micropyretic or Self-propagating High-temperature (combustion) Synthesis.

The porosity that is generated in combustion synthesized (SHS) products continues to be the most uncontrollable and serious disadvantage. All SHS processes are initiated by the rapid input of energy from an external source such as an electric arc or heated filament, and such an increase must be rapid enough to prevent any significant conversion of the reactants to the products before the ignition temperature is reached (pre-ignition reaction). Unlike in sintering, where the sample shrinks after the process, during SHS the product usually expands. According to published references, combustion synthesized (SHS) monolithic objects and materials have porosities of up to 40.6 vol. %, and may suffer from other limiting factors such as the segregation of reactants at grain boundaries (Subrahmanyam, et al., 1992, above). Due to a lack of control over the pressure-less SHS process, the products have a tendency to develop non-homogeneous phase distributions. For heating elements, the non-uniformities in the products lead to destructive localized overheating in areas where the non-uniformities exist. It is clear that components and materials produced with the pressure-less SHS process have degraded properties, and can be characterized as mechanically weak and fragile. Although much prior work has centered on developing techniques to eliminate porosity in combustion synthesized (SHS) materials, success has only been achieved in a very limited number of cases. Combustion synthesis processes are rapid by nature, and the time for simultaneous sintering is too short to be of value. External force or pressure is difficult to apply in most situations involving combustion, and the application of pressure limits this method to use with simple shapes like cylinders, and to situations where die damage is not a problem. If a liquid phase is involved then it is hoped that this liquid phase will wet the products and will fill the porosity that is formed during the combustion reaction, creating a denser, stronger product. Unfortunately, most often the liquid phase does not wet the products, or the volume of the liquid may not be enough to fill the pores and the residence time of the hot liquid may be too short to fill the pores in time. In U.S. Pat. No. 5,837,632 Sekhar, et al., claim porosity in certain combustion synthesized heating elements may be significantly reduced by applying a large electrical current (100 Amps or more) and heating the elements up to high temperatures (1500–1600 C) for extended times, however it appears that excessive shrinkage rates in the length (about 28%) and volume (about 48%) must take place in order to sinter the element. The large shrinkage rates and high temperatures probably make this densification technique impractical for many important applications (such as the conformal lamination of combustion synthesized SHS materials, or co-lamination with other materials and substrates) that will be described in the present invention.

Other deposition technologies include arc plasma or flame spraying methods that utilize a very expensive, high-energy beam machine capable of producing ceramic coatings on suitable substrates. Only materials that due not sublime or dissociate at high heat are suitable for arc plasma spraying. The plasma sprayed ceramic coatings are brittle and tend to have a high degree of undesirable as-sprayed porosity. Also, the process is not well suited for the fabrication of precision miniaturized "meso-scale" devices.

SUMMARY OF THE INVENTION

The instant invention provides novel compositions of reactive Aluminum, Aluminum alloys, $B_2O_3$—$SiO_2$ reactive powders, carbon-based fugitive (volatile) organics that permit a controlled, lower temperature sintering process for the production of resistive heating materials without formation of structurally destabilizing pores that are otherwise created by rapidly escaping pyrolysis produced gases during the higher temperature sintering that occurs in conventional combustion reaction processes. Preferred compositions and cermet assembly methods of the present invention avoid the formation of highly porous and weakened sintered cermet materials permitting the manufacture of structurally stable cermet assemblies resistant to sagging.

Preferred embodiments of the instant invention include process techniques for producing cermet-based resistive heating materials that are capable of attaining and sustaining operating temperatures greater than 1400 C in air or other oxidizing atmospheres. The preferred embodiments of the present invention exceed the capabilities of non-Nobel metallic resistive heating materials including Pd/Ag, Ag, Au, Ni, Cu, Ti, Al, Ni—Cr (nichrome), Fe—Cr—Al (Kanthal), Si, polysilicon, and refractories such as W, Mo, and Ta. The Al and $B_2O_3$ compositions of the present invention allows the production of cermet-based resistive heating materials that are substantially less expensive than other oxidation-resistant refractory metals including Pt, Ir, Rh, Pd and Re.

In accordance with further aspects of the invention, the present invention provides novel resistive heating materials, preferably in tapecast form, that may be advantageously processed and operated in oxidizing or air atmospheres at temperatures greater than 1400 C, and thus are not limited to sintering processes and operation in non-oxidizing environments in the way that refractory metal resistive heating materials (such as W, Mo, Ta, and Pd thick films) are.

In accordance with other aspects of the invention, the present invention provides novel cermet-based resistive heating materials with superior power handling and heating capabilities, expressed in the form of Watts/unit surface area, that may exceed 100 $W/cm^2$ when heating in air, 175 $W/cm^2$ for heaters clamped to metal, and 875 $W/cm^2$ for heating liquids (water). Manufactures specifications for the best conventional thick film resistive heating elements typically recommend 20 $W/cm^2$ for air applications, 35 $W/cm^2$ for heaters clamped to metal and 175 $W/cm^2$ for heating water, and maximum operating temperatures of about 500–600 C.

In accordance with still further aspects of the invention, the present invention also provides novel resistive heating materials that are inherently more resistant to oxidation-corrosion and chemical attack at elevated temperatures, with properties more similar to refractory ceramics including SiC and $MoSi_2$, when compared to nearly all of the commonly used metallic resistive heating materials including metals such as Pd/Ag, Pd, Ag, Cu, Ti, Ni, Au, Al, Ni—Cr (nichrome), Fe—Cr—Al (Kanthal), Si, polysilicon, and refractories such as W, Mo, and Ta.

In accordance with yet other aspects of the invention, the present invention provides novel resistive heating materials where the microstructure is characterized as having relatively compliant metal phase inclusions (such as aluminum or other metallic alloy particles) dispersed in a ceramic matrix, and the composition has been optimized to give substantially improved mechanical toughness, thermal shock resistance and bonding strengths.

In accordance with still another aspect of the invention, the present invention provides novel resistive heating materials containing primarily metal-carbide, boride, silicide and other non-oxide ceramics that are preferably processed in tapecast form, resulting in a thin flexible sheet that may be easily patterned or machined in the as-cast "green" or pre-fused state, and laminated onto a variety of similar or dissimilar substrates using only light pressure and comparatively low heat with regards to conventional heating material production processes. The preferred embodiment of the transfer tape process has the distinct advantage of significantly lower labor cost when compared with other conventional methods (such as printed thick films, CVD deposition, wire-wound coils, etc.) that are used to form resistive heating elements.

In accordance with still further preferred embodiments of the instant invention, is the manufacture of flexible ceramic-loaded polymer sheets, preferably in tapecast form, that is easily patterned in the un-fired or green state using low-cost, mass production pattering techniques. The pattering techniques include punching, shearing, stamping, and low-power laser micro-machining to form desired shapes.

In accordance with yet another preferred embodiment of the invention, the present invention provides flexible and pliable resistive heating materials, preferably in tapecast form, that may be easily and efficiently laminated directly onto many differently shaped substrates including plates, tubes (inside or outside), and complex or convoluted 3-dimensional substrates by applying only light pressure and/or low heat (about 75 C).

In accordance with further preferred embodiments of the invention, the present invention provides novel resistive heating cermet materials, preferably in thin flexible tapecast sheet form, that are compatible with High Temperature Co-fired Ceramic (HTCC) laminated ceramic devices where sintering temperatures well above 850 C are required.

In accordance with still further preferred embodiments of the invention, the present invention also provide resistive heating materials, preferably in tapecast form, with novel cermet compositions and thermal coefficients of expansion (TCE) that are well matched with the TCE's of useful insulating or high temperature substrates that include quartz (fused silica), alumina, and single crystal silicon.

In accordance with additional preferred embodiments of the invention, the present invention provides novel low-profile resistive heating materials, preferably in flexible thin tapecast form, that do not require the complexity or expense of screening, printing, or stenciling costly metal inks, slurries and pastes (such as Pd/Ag, Pt, and Au) to form resistive heating and serpentine conductor paths.

In accordance with other preferred embodiments of the invention, the present invention provides a low cost, high performance alternative to the wet lithographic and conventional microfabrication techniques used to form or deposit heating elements, particularly in the meso-scale range, that is from about 30 micrometers up to several centimeters.

In accordance with still other preferred embodiments of the invention, the present invention minimizes frequently reported problems related to the sagging or slumping of unsupported layers of as-cast "green" ceramic tapes associated with the fabrication of monolithic ceramic structures during the laminating and pressing stages, and during the high temperature sintering stages, by providing novel compositions and formation techniques for producing tapecast carbon-loaded, flexible polymer sheets. The thermally fugitive carbon tapes or sheets have sufficient green strength and flexibility that they may be easily punched, sheared, or laser machined into almost any desired shape or pattern, and can be conveniently inserted to support overlying tapecast ceramic layers during pressing and sintering stages so that sagging, slumping and deformation is minimized.

In accordance with still further preferred embodiments of the invention, the present invention provides porous filters and thermally regenerative oxidation systems that incorporate direct-laminated high temperature cermet resistive heating elements with superior thermal heat transfer, rapid thermal response, higher operating temperatures, and significantly better oxidation and regeneration efficiencies.

BRIEF DESCRIPTION OF THE DRAWINGS

The preferred and alternative embodiments of the present invention are described in detail below with reference to the following drawings.

FIG. 7 is a method flow chart of preparing a cermet laminate device;

DETAILED DESCRIPTION OF THE PREFERRED EMBODIMENT

Figure 1:
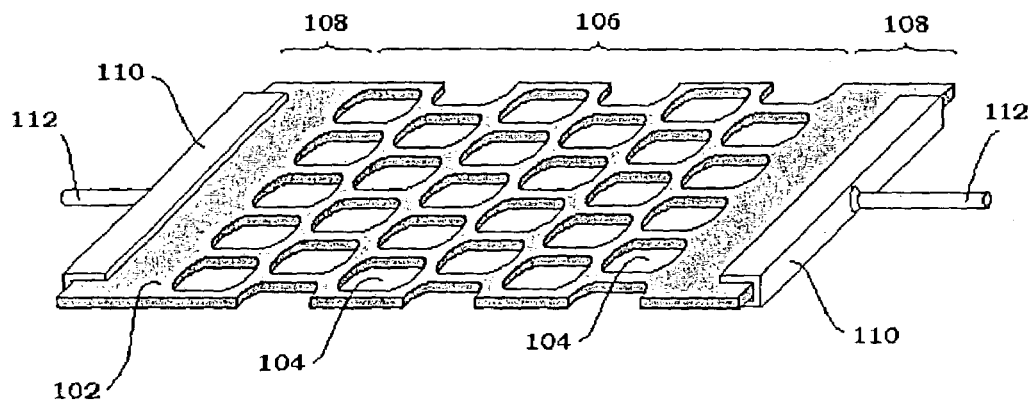
FIG. 1 is a perspective view of an exemplary low profile planar heating element fabricated from a monolayer sheet or tape of the cermet resistive heating material, in accordance with the present invention.

The present invention provides novel chemical compositions for producing high temperature electro-conductive cermet materials, their formation, and methods of incorporating these materials into devices that require high watt-density heating elements. As disclosed in the preferred embodiments, the cermet resistive heating materials of the present invention also provide a faster responding, thermally efficient heating layer with exceptionally uniform surface temperature distributions. Alternatively, surface temperature distributions may be tailored give rapidly changing spatial gradients and precision localized heating where needed.

Thin pliable polymer sheets that are heavily loaded with ceramic powders can be formed by a number of processes. Preferably, ceramic sheets used in the production of multi-layer ceramic devices are formed by a tape casting process. The tape casting process includes the steps of casting a slurry onto a moving carrier surface, such as mylar or cellophane, and spreading the slurry to a controlled thickness with the edge of a blade. The cast slurry is then dried, resulting in a thin, flexible tape that can be easily cut or stamped to a desired configuration with relatively high precision. Tape casting thickness tolerances are nominally about 1.5 micrometers, and the surface roughness of sintered ceramic tapes is typically in the range of 0.3 micrometers.

Additives are typically introduced into the slurry prior to casting to control the properties of the final tape. For example deflocculants (Darvan C®), solvents (ethanol, xylene), binders (hydroxypropyl methocellulose) and plasticizers (polypropylene glycol) may be added to the ceramic powders to provide castability, control viscosity, and provide desirable flexibility and strength to the cast tapes.

After the ceramic sheet has been fabricated, complex or simple patterns such as holes, vias and channels with a minimum size of about 25 micrometers may be mechanically punched into the as-cast (or "green") ceramic tape. At this stage, the green ceramic sheets are typically placed in a screen printing device and conductive metal inks, pastes or slurries are screened onto the green ceramic sheets in a desired pattern to form conductive metal films and resistive elements. An important distinction is usually made between low-temperature co-fired ceramics (LTOC) systems and high-temperature co-fired ceramics (HTCC) systems. Most commercially available LTCC tape systems are glass-ceramic composites, typically mixtures of cordierite ($2MgO.Al_2O_3.5SiO_2$), mulite ($3Al_2O_3.2SiO_2$), and alumina ($Al_2O_3$) with a high percentage of glass frit so that the tape systems achieve nearly full density when they are sintered at no more than about 850° C. Although uniform and predictable, shrinkage upon sintering is typically about 12% in the x-y plane and 15% in the z-axis. A particular disadvantage of conventional LTCC ceramic tape systems is that they often are not compatible with $CO_2$ laser machining techniques. Heat transferred from the concentrated laser energy frequently results in the viscous flow of lower melting components in the tape compositions back into freshly machined channels or other features.

If a multilayered ceramic device is being fabricated from the patterned sheets, they can be stacked in any desired order and pressed together (usually well under 500 psi) while applying moderate heat (typically about 75 C) to form a "green" laminated tape stack. Alternative methods for laminating green ceramic sheets include applying a light coating of solvent to the sheets and laminating under moderate pressure (typically well under 500 psi).

One or more components of the cermet composition of the present invention is initially selected from a small group of reactive metals, preferably aluminum or aluminum alloys, with relatively low melting temperatures (less than about 700 C). One or more components of the cermet composition of the present invention is also initially selected to be substantially boron oxide ($B_2O_3$), or a glassy composition containing $SiO_2$ and at least 13 wt % $B_2O_3$, (Pyrex®, for example). Fine powders of –100 mesh or less can be used satisfactorily. It is advantageous for the reactive metal components to have melting temperatures that are substantially lower than the common oxide phase of the reactive metal. A preferred example is Al (m.p.=660 C) and $Al_2O_3$ (m.p.=2045 C). By definition, the glass softening point is when the viscosity of a glass is $10^{7.65}$ poise. The glass softening temperature of the preferred boro-silicate containing glass should be less than about 820 C. The glass softening temperature of Pyrex®, for example, is 820 C. At least one component of the cermet composition of the present invention is also initially selected from a group of relatively inert filler materials characterized by groups of carbide, boride, and silicide ceramics with the unique combination of superior chemical and oxidation resistance, high electrical and thermal conductivity, high mechanical strengths, and improved thermal shock resistance at high temperatures. Preferred examples of filler materials are SiC, $MoSi_2$, $Mg_2Si$ and other silicides of Mo, Ti, W, Cr; Hf, B, Zr, V, Nb, Fe, Mn, Pd, and Ta. Other examples of preferred filler materials are $AlB_2$, $AlB_{12}$, $B_4C$, $MgB_2$, $MgB_{12}$, $HfB_2$, TiB, $TiB_2$, $ZrB_2$, $B_4Si$, $B_6Si$ and other borides of Al, Cr, Mo, W, V, Nb, Zr, Co, Pd, Yt, La, Ni, Ti, Fe, and Mg. Other examples of preferred filler materials are TiC, HfC, TaC, ZrC, WC, and other carbides of Nb, Mo, and Cr. Other examples of preferred filler materials include the relatively new ternary compounds based on $Ti_3SiC_2$, $Ti_3AlC_2$, and $Ti_3GeC_2$. Mixtures of the preferred carbide, silicide, boride and ternary filler materials may also be used advantageously in this invention.

Initially, the solid components may be in the form of microscopic fibers or particulate powders that are combined with thermally fugitive plasticizers (polypropylene glycol, butyl benzyl phthalate), binders (hydroxypropyl methocellulose), deflocculants (Darvan C®), defoamers (Surfynol PC Defoarmer), surfactants (Surfynol SE-F) and solvents (ethanol, xylene, de-ionized water) to produce slurries or dispersions (slips) that are suitable for tapecasting techniques, roll compaction or extrusion. The preferred procedure for making the tapecast, solid-loaded polymer sheets includes a novel coating step for $B_2O_3$ powders that aids in the production of dispersions or "slips" with the desired viscosities for tapecasting and other slipcasting techniques. Commonly available oxides of boron, such as $B_2O_3$ powders, are highly soluble in water and other polar solvents including ethyl alcohol, and there is a strong exothermic hydration reaction that takes place when the boron oxide powder is introduced into water or other polar solvents (ethanol). Prior to this invention, the hydration reaction made it impossible or very difficult to disperse reasonably high amounts of $B_2O_3$ (and other solid powders) for producing useful slurries or slips with viscosity levels that are suitable for casting. The $B_2O_3$ powders are de-activated by first soaking the fine $B_2O_3$ powders in approximately a 2 to 10 wt. % aqueous solution of polyvinyl alcohol (Dupont Company, PVOH or PVA), and then drying the wet powders at temperatures a little below the boiling point of water. A preferred type of PVA is 80% hydrolyzed with a molecular weight range of approximately 9000 to 10000 Daltons. After drying is complete, the agglomerated $B_2O_3$ particles are dry milled and sifted to produce the desired range of powder sizes. At this stage it is believed that the reactivity of the $B_2O_3$ powders has been greatly reduced by coating and infiltrating the powders with a polymeric layer of PVOH. Although polyvinyl alcohol, (PVOH) is readily soluble in water, it is much less soluble in solvents such as xylene and ethyl alcohol (ethanol). After the $B_2O_3$ powders have been coated and infiltrated with PVOH as described above, they remain relatively inert and non-reactive when they are dispersed in non-aqueous slurries containing mixtures of xylene and absolute grades of ethanol, and much higher solids loading can be achieved with reasonably low viscosities that are suitable for tape casting techniques. Absolute grades of ethanol contain less than 0.5% water, and may be blended with 2-propanol to achieve an approximate 90% ethanol concentration.

After the cermet compositions of the present invention have been formed into thin pliable sheets or tapes, they may be punched, cut, or laser machined into any number of desired patterns and laminated onto a substrate (such as an aluminum oxide plate or quartz tube). Alternatively, the as-cast green cermet tapes and patterned sheets of the present invention may be stacked and laminated to form multilayer structures that incorporate green tapes or sheets of similar or dissimilar materials.

Sintering of a laminated assemblage of resistive heating cermet tapes or patterned sheets and substrates may be accomplished in the present invention by employing any of several advantageous methods. In one preferred embodiment of the present invention the green or unfired cermet tapes or patterned sheets may be sintered in a furnace with an inert or air (oxidizing) atmosphere at temperatures ranging from about 650 C to over 1200 C. The present invention does not require rapid heating and ignition as currently required with conventional combustion synthesized products. The operational characteristics of the present invention provides for a more controlled sintering process wherein the melted glass forms a liquid phase and fills in the voids that would otherwise entrap pore-producing gases and prevents exposure of atmospheric oxygen to the reactive metal components. This in turn allows for prolonged binder burnout steps and generates formation of products with greatly reduced porosity, better uniformity, structural integrity, and manufacturing-process control. The more controlled sintering allows for a more thorough release of combustion gases to avoid formation of highly porous combustion synthesized products. The greatly reduced porosity imparts higher strength and denser products over conventional processes.

In another preferred embodiment of the present invention, the pliable as-cast green cermet tapes and patterned sheets may be mechanically laminated onto a previously sintered substrate, and then sintered in a furnace with inert or air oxidizing atmosphere ranging from about 650 C to about 1200 C. Lamination of the cermet tapes or patterned sheets can be easily and conveniently accomplished by applying inexpensive, non-toxic solvents (such as ethyl alcohol) or thermally fugitive organic adhesives and light pressure. Alternatively, multilayer stacks containing the green cermet tapes or patterned sheets of the present invention may be stacked with other similar or dissimilar tapes and patterned sheets, and laminated together by applying moderate pressures (usually less than 500 psi) and/or mild heat (about 90 C) prior to sintering the multilayer laminates and assemblages.

With few exceptions it is possible to obtain excellent adhesion and bonding between the cermet resistive heating materials disclosed in this invention and most ceramic-based substrates. Most metal foils and films have thermal coefficients of expansion (TCE) that are too large to be compatible with common and useful ceramic substrates such as quartz (fused silica) and aluminum oxide. The instant invention is particularly advantageous in that the TCE of the cermet resistive heating material is well matched with other common ceramic-based materials promoting adhesion and resistance to warping or de-lamination during thermal cycling. If required, coatings may be applied (optionally) to the cermet resistive heating materials, patterned sheets or substrates to promote bonding or adhesion, or to provide an electrically insulating layer. Preferred examples of optional high-temperature insulating coatings are electronic sealing glasses and colloidal dispersions of. silica or slurries containing nano-sized silica particles (<200 nm), with bonding being accomplished by heating the assemblage, including cermet resistive heating materials, patterned sheets, laminates and substrates, to a temperature in the range of 600 to 1200 C in an air or inert atmosphere.

The instant invention discloses novel compositions based on aluminum bearing powders and boron oxide ($B_2O_3$) based preferred boro-silicate glass powders that may be combined in selected proportions along with other metal-carbides, silicides, and borides to produce low-porosity, mechanically tough and compliant ceramic-metal (cermet) composites that are particularly well adapted for use in high-temperature resistive heating applications. The low melting boro-silicate glass as produced during the fusion or sintering process fills in pores made by escaping gases and prevents aluminum from being oxidized by atmospheric gases prior to a combustion synthesis reaction. Thus the molten boro-silicates provides a protective physical effect by reducing porosity that forms from escaping gases during fusing, and a chemical protective effect by preserving the Aluminum against oxidation by atmospheric oxygen. Furthermore, the pore-filing and molten boro-silicates provide the oxygen to the Aluminum to ensure that thermal activation ensues from reaction with the oxygen derived from the physically contacting molten boro-silicate glass components. The present invention has the advantage of providing novel compositions that do not necessarily require rapid, highly exothermic micropyretic reactions (usually T>2500 K). The high temperature resistive heating cermet materials disclosed in the present invention have substantially reduced porosity with improved durability and strength when compared with conventional, prior art materials prepared using micropyretic (SHS) synthesis and other similar techniques. It is also possible to vary the electrical resistivity of the new high temperature electro-conductive cermets disclosed in this invention over a wide range (from milliohm·cm up to megaohm·cm) by using techniques such as by adding non-conductive filler material that are similar to those used to adjust the resistance of conventional SiC and $MoSi_2$ based ceramic heating elements. Examples of non-conductive filler material are aluminum nitride and zirconium dioxide.

Example 1. Fabrication of tapecast cermet resistive heating element on a quartz tube. According to the present invention, −100 mesh $B_2O_3$ powders were coated and "deactivated" by first soaking the $B_2O_3$ powders in an aqueous solution of about 2 wt. % polyvinyl alcohol (Dupont Company, PVOH or PVA), and then drying the wet powders at temperatures a little below the boiling point of water. After drying was complete, the $B_2O_3$ agglomerates were dry milled and sifted to produce the desired range of fine powder sizes. At this stage the reactivity of the $B_2O_3$ powders has been greatly reduced by coating and infiltrating the powders with a polymeric layer of PVOH. A tape casting slurry was made by combining about 162 parts by weight black SiC powders (approximately −220 mesh), about 136 parts by weight of PVA coated $B_2O_3$ powders (approximately −325 mesh) and about 162 parts by weight of aluminum powders (approximately 1–5 micrometers) with a non-aqueous mixture of solvents comprised of about 81 wt. % xylenes and 19 wt. % ethyl alcohol (200 proof). The weight ratio of solid powders divided by the sum of the solid powders plus the solvents (the solids loading) is about 68.6 wt. %. About 5 wt. % (based on total solvents mixture) of a commercial dispersant known as Menhaden Z-3 fish oil (Werner G. Smith, Inc., Cleveland Ohio) was added to the ethanol/xylenes solvent mixture. The slurry of solid powders, solvents and dispersant was placed in a sealed container with an appropriate number of grinding media and roll-milled for a total time of about 6 hours. The container of slurry was then briefly reopened for the addition of about 12.8 parts by weight of polyvinyl butyral (PVB) binder, about 12.8 parts by weight of polyethylene glycol 400 plasticizer (Union Carbide, Danbury, Conn.), and about 25 parts by weight of butyl benzyl phthalate plasticizer. The slurry with binders and plasticizers was then roll-milled again for about 2 hours. The slurry was then decanted and de-aired with a mechanical vacuum pump for several minutes to remove entrapped air bubbles. The slurry was then ready for casting on a standard tapecasting machine. The gap of the doctor blade was set at about 0.022 inches. After drying for several hours, the solids-loaded polymer tapes had an as-cast green thickness of about 0.014 inches. The as-cast tapes had sufficient green strength to be mechanically punched, cut, sheared, or laser machined into almost any desired pattern or shape with the same precision that is possible with other high-quality tapecast materials. A sheet of the as-cast green ceramic tape was cut with ordinary steel shears and wrapped loosely around a fused silica (quartz) tube with a diameter of about 0.395 inches. Additional tape strips were laminated around the extreme ends of the tubular substrate sheet to form low resistance "cold zones" in a manner similar to FIG. 3 of the present invention. The green laminated tape structure was sintered on the quartz tube by heating the structure in open air with a hand held air-propane torch. After cooling in air, a composite ceramic heating element with no visible cracks and relatively low porosity had been fabricated directly on the quartz tube. The low resistance ends of the ceramic heating element were coated with a silver paste, and after drying the paste, steel spring clamps were attached to the ends to serve as terminals for applying an electrical potential (voltage) across the axial length of the heating element. The total active surface area of the tubular ceramic heating element measured about 0.62 square inches. The heating element was connected to a 60 Hz AC voltage source and glowed bright red with a measured current of about 12 amps at approximately 8 Volts. The calculated watt density in stagnant air was about 96 Watts/0.62 sq. inches=156 Watts/sq. inch. Other structures (similar to FIG. 3) fabricated with the cermet resistive heating material according to the present invention have reached peak surface temperatures measuring in the 1500 to 1600 C range and calculated surface watt densities greater than 700 W/square inch.

A beneficial, interconnected microstructure is formed in stages during heating and sintering of the cermet resistive heating materials of the present invention. After the preferred tapecasting or roll compaction formation process, the initial cermet composition consists of a tightly packed, uniformly dispersed matrix of particulates or powders and generally organic additives such as binders or plasticizers. Upon first heating the initial cermet composition to temperatures of about 300 to 400 C, pyrolysis of organics including binders, plasticizers, and other thermally fugitive materials takes place. During pyrolysis, CO, $CO_2$, $H_2O$, hydrocarbons and hydrogen gases are released to create a temporarily neutral or reducing microstructural environment. As the temperature is increased slightly, the $B_2O_3$ melts at about 460 C, and infiltrates the compacted powder matrix. The boron oxide powders readily undergo a transformation into the vitreous (glass-like) liquid state, and can be classified as a chemically stable, but physically unstable oxide. It is thought that boron oxide may act as an effective flux, and helps clean or remove electrically insulating native oxides that may be present on the surface of filler material powders ($SiO_2$ coatings on SiC particles, for example), thus improving the electrical conductivity and strength of the cermet product. It is also believed that the appearance of the liquid boron oxide phase may initially hinder the rapid exothermic oxidation of the reactive aluminum by hindering the penetration or diffusion of free oxygen that may be in the environment. Increasing the temperature further, the aluminum powders begin to melt at about 660 C, and form molten mirodroplets dispersed in the matrix that contains the relatively inert filler material powders and the liquid boron oxide phase.

The desired stoichiometry of the aluminum and boron oxide phases is adjusted so that upon further heating, the aluminum reacts exothermically to completely oxidize the boron oxide phase creating an $Al_2O_3$ product phase and leaving at least some unreacted molten Al. The aluminothermic reaction may also generate heat that helps to initiate other reactions that form aluminum borides and other phases with the residual B. An approximate description of the reaction is given by, $$\text{filler material} + B_2O_3 + (3+\chi)Al = \text{filler material} + Al_2O_3 + AlB_2 + (\chi)Al, \text{ where } \chi > 0 \qquad (\text{eq. 1})$$

Although equations 1 is only approximate, and considerable variation is observed with regard to the proportions and types of product phases, the amount of aluminum powder contained in the initial reactant mixture should always be sufficient to completely oxidize the boron oxide phase and result in at least some residual aluminum phase in the product, as indicated above with $\chi$ always greater than zero. Preferably, the ratio of metallic Al with respect to the amount of $B_2O_3$ in the initial reactant mixture can vary from about 2 to 1 up to about 4 to 1, and preferably the ratio of filler materials (such as $MoSi_2$ or SiC) with respect to the amount of $B_2O_3$ can vary from about 0.4 to 1 up to about 9 to 1. At temperatures below their melting temperature of about 660 C, the residual Al particles will be a solid, relatively soft phase enclosed by a layer of aluminum oxide formed by the surface oxidation of the aluminum phase. At operating temperatures higher than the melting temperature of the aluminum phase, the liquid aluminum remains completely enclosed and contained by a surface layer of aluminum oxide (m.p. 2045 C) that greatly inhibits the loss of any volatile phases. At temperatures above or below the melting point of the metallic aluminum or magnesium phase, the ductile metallic phase provides a softer, compliant component that substantially improves the toughness and thermal shock resistance of the cermet material. Unlike most combustion synthesized SHS materials that expand, the cermet materials of the present invention shrink slightly during sintering and have relatively low porosity. It is believed that consolidation of the initial powder compact has been achieved by utilizing boron oxide combined with reactive metal components with relatively low melting temperatures to form a liquid phase that infiltrates the powder matrix before exothermic reactions and high temperature sintering take place. A higher content of coarse fraction of metal in the reaction mixture may be used to act like the addition of an inert filler material, and leave higher quantities of unreacted metal in the product.

According to the present invention, the previously described sagging problems are solved by the fabrication and advantageous use of novel tapecast carbon-loaded, flexible polymer sheets. The thermally fugitive carbon tapes or sheets have sufficient green strength and flexibility that they may be easily punched, sheared, or laser machined into almost any desired shape or pattern. The preferred procedure for making the tapecast, carbon-loaded polymer sheets begins with a novel "de-activation" step that aids in producing dispersions or "slips" with the desired viscosities for tapecasting and other slipcasting techniques. Commonly available commercial forms of carbon powder, such as "carbon black" and "activated carbon" are characterized by having a random microcrystalline graphite structure that is highly porous even at the molecular level, giving the fine powders, a very large effective surface area, (greater than 1000 $m^2$/gram). The very large surface area, (5 grams of carbon powder can have the surface area of a football field), and tremendous liquid absorption capacity of fine carbon powders makes it nearly impossible to disperse the powder and achieve the reasonable solids loadings that are necessary for producing castable slurries or slips with useful viscosity levels. The carbon is de-activated by first soaking the fine carbon powders in approximately a 2 to 10 wt. % aqueous solution of polyvinyl alcohol (Dupont Company, PVOH or PVA), and then drying the powders at temperatures just below the boiling point of water. After drying is complete, the agglomerated carbon particles are dry milled and sifted to produce the desired range of powder sizes. At this stage it is, believed that the effective surface area and large absorptivity of the carbon powders has been greatly reduced by coating and infiltrating the pores with a polymeric layer of PVOH. Although polyvinyl alcohol, (PVOH) is readily soluble in water, it is much less soluble in solvents such as xylene and ethyl alcohol. After the carbon powders have been coated and infiltrated with PVOH as described above, they remain relatively inert and non-absorptive when they are dispersed in non-aqueous slurries containing mixtures of xylene and absolute grades of ethanol, and much higher solids loading can be achieved with reasonably low viscosities that are suitable for tape casting techniques. A preferred tape casting slurry is made by combining about 40 wt. % of the PVOH coated carbon powder (−325 mesh size) with a non-aqueous mixture of solvents comprised of about 81 wt. % xylenes and 19 wt. % ethyl alcohol (200 proof). The weight ratio of carbon powders divided by the sum of the carbon powders plus the solvents (the carbon solids loading) is about 42 wt. %. About 7 wt. % (based on total solvents mixture) of a commercial dispersant known as Menhaden Z-3 fish oil (Werner G. Smith, Inc., Cleveland Ohio) is added to the ethanol/xylenes solvent mixture. The slurry of carbon powders, solvents and dispersant is placed in a sealed container with an appropriate number of grinding media and roll-milled for a total time of about 8 hours. The container of slurry is then briefly reopened for the addition of 9 parts by weight of polyvinyl butyral (PVB) binder, 4.5 parts by weight of polyethylene glycol 400 plasticizer (Union Carbide, Danbury, Conn.), and 4.5 parts by weight of butyl benzyl phthalate plasticizer. The slurry with binders and plasticizers is then roll-milled again for about 4 hours. The slurry is then decanted and de-aired with a mechanical vacuum pump for several minutes to remove entrapped air bubbles. The carbon slurry is then ready for casting on a standard tapecasting machine. The speed of the carrier and gap of the doctor blade may be set at desired values to obtain tape thickness ranging from about 50 microns up to several millimeters. After drying for several hours, the flexible carbon-loaded polymer tapes have sufficient green strength to be mechanically punched, cut, sheared, or laser machined into almost any desired pattern or shape with the same precision that is possible with other high-quality tapecast materials. The carbon-loaded polymer tapes of the present invention may be stored for at least several years without significantly ageing or degrading.

As shown in FIG. 1, a heating element may be fabricated from a monolayer sheet or tape of the cermet resistive heating material according to the present invention. A tape or sheet of the as-cast "green" cermet resistive heating material, 102, may be punched or perforated to form holes or apertures, 104, in the central portion, 106, of the sheet or tape. End zones, 108, of a desired length at opposite extremes of the sheet or tape element are not perforated. After the sintering process, the electrical resistance of the un-perforated end zones, 108, will be much less than the perforated central zone, 106, because the average transverse cross-sectional area of. cermet heating material in the perforated central zone is much smaller. When an electrical current is made to flow through the perforated central zone, 106, by applying an electrical potential to the un-perforated ends, 108, most of the electrical power is dissipated in the higher resistance central perforated zone, 106. The perforated central zone, 106, reaches much higher operating temperatures compared with the un-perforated end zones, 108, because much more power ($=I^2R$) is dissipated as a result of the higher average electrical resistance in the perforated zone. Any geometric shapes that result in restricted zones of lower average transverse cross-sectional area of cermet heating material with respect to end or terminal zones with higher transverse cross-sectional areas are considered part of this invention. For example, a solid (un-perforated) layer (or rod) of cermet heating material in the shape of an "hourglass" will result in a resistive heating element with higher resistance and power dissipation in the narrower middle section or "hot zone", and lower resistance and power dissipation along the enlarged end zones or "cold zones". An electro-conductive metallic paste, such as Ag or Pd/Ag, may (optionally) be applied to the low resistance "cold zones" at the ends, 108, of the heating element to lower contact resistance and improve electrical connections. Conductive metallic contact plates or end clamps, 110, may be readily attached to the low resistance, "cold zones" at the ends, 108, of the heating element. Lead wires, 112, for supplying electrical current can be welded, bolted, or soldered to metallic coatings, contact plates or end clamps, 110. Apart from compactness and energy savings, the laminated tape cermet heaters confer several other significant advantages. For example, the laminated tape heaters are easy to locate in areas that are not accessible to coil heaters, such as in low-profile hotplates and heating strips.

Figure 2:
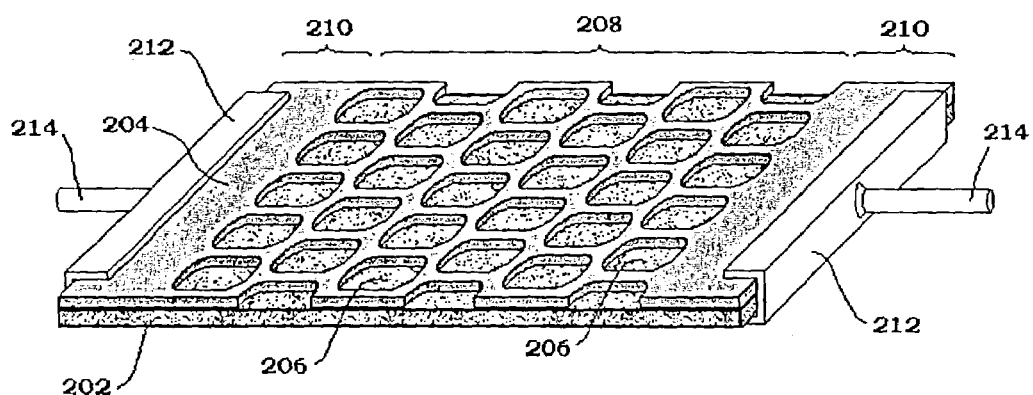
FIG. 2 is a perspective view of a monolayer sheet or tape of the resistive heating material laminated directly onto the substrate material, in accordance with the present invention.

As shown in FIG. 2 a substrate material, 202, may be heated to high temperatures by laminating a monolayer sheet or tape of cermet resistive heating material, 204, directly onto the substrate material. In one preferred embodiment of the present invention, the substrate, 202, may be a reticulated or porous material that is useful for filtering liquids, gases or particulates. The porous filter substrate, 202, may be an electrically non-conductive ceramic oxide such as $Al_2O_3$, $ZrO_2$, MgO, cordierite, fused silica (quartz), borosilicate glass, or spinet. Alternatively the porous filter substrate, 202, may be an electrically non-conductive composite ceramic substrate such as aluminum oxide toughened zirconia, partially stabilized zirconia, or various glass-ceramic compositions. Alternatively the porous filter substrate, 202, may be composite mixtures of electrically non-conductive ceramic phases such as $Al_2O_3$ or MgO and ceramic phases with relatively high thermal conductivities including AlN, SiC, TiC, HfC, $B_4C$, $Ta_2C$, ZrC, $Cr_3C_2$, WC, VC, TiB, $TiB_2$, $ZrB_2$, $Mo_2B$, MoB, $Mo_2B_5$, $TaB_2$, $HfB_2$, $AlB_2$, $MoSi_2$, $ZrSi_2$, $Ti_5Si_3$, TiSi, $TiSi_2$ and other metal-carbides, borides, and silicides. Alternatively, the porous filter substrate, 202, may be composed of naturally porous composite materials such as mixtures of diatomaceous earth and kaolin clay. Alternatively the porous filter substrate, 202, may be an electrically non-conductive ceramic fiber ceramic composite (CFCC) such as a ceramic metal oxide matrix reinforced with $Al_2O_3$ or SiC fibers. Alternatively the electrically non-conductive porous filter substrate, 202, may also be a nitride-based material with high thermal conductivity such as AlN, TiN, BN, TaN, or NbN. Electrically conductive metals, intermetallics, cermets, and metal-carbides, borides, and silicides may also be used as porous filter substrates, 202, in this invention if a layer of silica or other electrically non-conductive material is applied or deposited on the porous filter substrate, 202, to electrically isolate the cermet heating element, 204. A tape or sheet of the as-cast cermet resistive heating material, 204, may be punched or perforated to form apertures, 206, in the central portion, 208, of the sheet or tape. End zones, 210, of a desired length at opposite extremes of the sheet or tape element are not perforated. After the sintering process, the electrical resistance of the un-perforated end zones, 210, will be much less than the perforated central zone, 208, due to the fact that the average transverse cross-sectional area of cermet heating material in the perforated central zone, 208, is much smaller. When an electrical current is made to flow through the perforated central zone, 208, by applying an electrical potential to the un-perforated ends, 210, most of the electrical power is dissipated in the higher resistance central perforated zone, 208. The perforated central zone, 208 reaches much higher operating temperatures when compared with the un-perforated ends or "cold zones", 210, because much more power ($=I^2R$) is dissipated as a result of the higher average electrical resistance in the perforated "hot zone", 208. Any perforation patterns giving zones of lower average transverse cross-sectional area of cermet heating material, (and therefore zones of higher resistance and power dissipation) with respect to un-perforated end or terminal zones are considered part of this invention. An electro-conductive metallic paste, such as Ag or Pd/Ag, may (optionally) be applied to the low resistance "cold zones" at the ends, 210, of the heating element to lower contact resistance and improve electrical connections. Conductive metallic contact plates or end clamps, 212, may be readily attached to the low resistance, "cold zones" at the ends, 210, of the heating element. Lead wires, 214, for supplying electrical current can be welded, bolted, or soldered to metallic coatings, contact plates or end clamps, 212. According to the present invention, the cermet heating element, 204, can be perforated in the as-cast green state by punching or laser machining, and then laminated onto the porous filter substrate, 202, by applying light mechanical pressure and/or low heat (about 75 C). Layers of the as-cast green cermet heating material can be co-fired with green substrate materials, or applied to post-sintered substrates and then re-fired. Fast thermal response times, higher operating temperatures, excellent thermal heat transfer and significantly better oxidation or regeneration efficiencies can be achieved with the present invention because the cermet heating elements are in direct intimate contact with the porous filter substrate. Thermally regenerative oxidation systems and high temperature porous filters have many environmentally important applications that include the thermal oxidation (neutralization) of toxic exhaust gases, carbon soot and particulates in diesel engines or coal-fired power plants, as well as the destruction or neutralization of pollutants such as volatile organic compounds (VOCs) and solvents.

Figure 3:
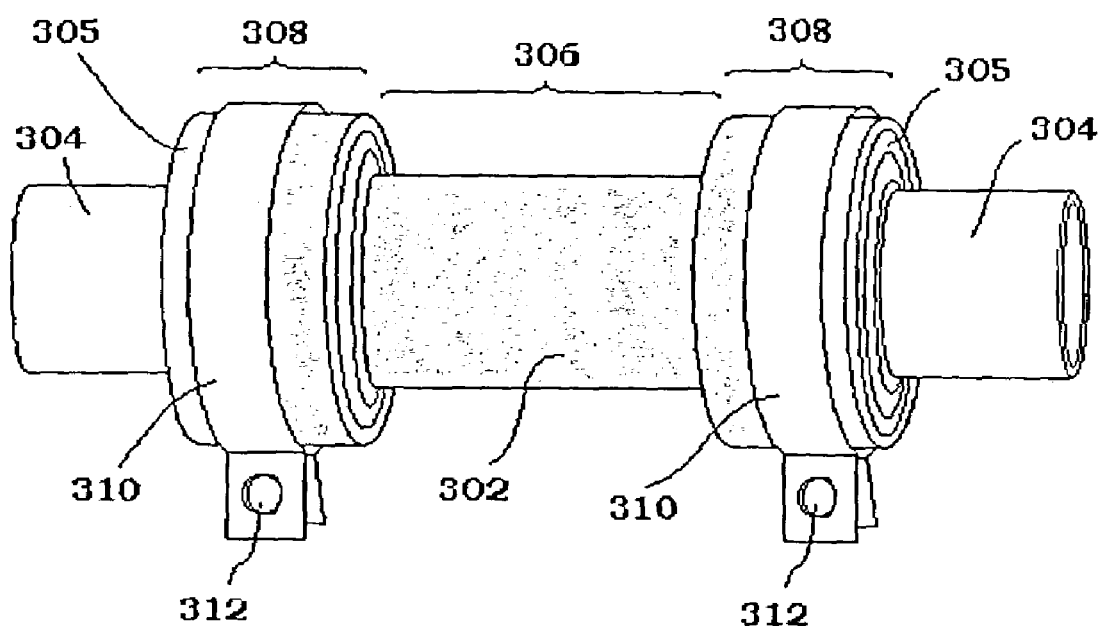
FIG. 3 is a perspective view of an exemplary high temperature, hollow tubular heating element that is formed by rolling and laminating layers of cermet resistive heating material, in accordance with the present invention.

As shown in FIG. 3, high temperature tubular heating elements may be formed with layers of cermet resistive heating material according to the present invention. Sheets or tapecast layers of the as-cast green cermet heating material are easily rolled into tubular structures, 302. Optionally, the sheets or tapecast cast layers may be wrapped on a forming mandrel or core substrate, 304, of arbitrary cross sectional geometry and length to form a hollow tubular element. Additional layers of the cermet resistive heating material, 305, are then laminated onto opposite ends of the hollow tubular section to form a smaller-diameter central zone, 306, of a desired length, and larger-diameter end zones, 308, of a desired length. After the sintering process, the electrical resistance of the larger-diameter end zones, 308, will be much less than the central (smaller-diameter) zone, 306, because the average transverse cross-sectional material area of the end zones, 308, is much larger compared to the central zone, 306. When an electrical current is made to flow through the central zone, 306, by applying an electrical potential to the larger diameter end zones, 308, most of the electrical power is dissipated in the higher resistance central zone, 306. The central "hot zone", 306, reaches much higher operating temperatures compared with the larger diameter end zones or "cold zones", 308, because much more power ($=I^2R$) is dissipated as a result of the higher average electrical resistance in the central "hot zone", 306. An electro-conductive metallic paste, such as Ag or Pd/Ag, may (optionally) be applied to the low resistance "cold zones" at the ends, 308, of the heating element to lower contact resistance and improve electrical connections. Conductive metallic contact plates or end clamps, 310, may be readily attached to the low resistance, "cold zones" at the ends, 308, of the tubular heating element. Lead wires, 312, for supplying electrical current can be welded, bolted, or soldered to contact plates, clamps, or metallic coatings, 310. In one preferred embodiment of the present invention, the core substrate, 304, may be a reticulated or porous material that is useful for filtering liquids, gases or particulates. Alternatively the core substrate, 304, may be a hollow tubular section of an electrically non-conductive ceramic oxide such as $Al_2O_3$, $ZrO_2$, MgO, cordierite, fused silica (quartz), borosilicate glass, or spinel. Alternatively the core substrate, 304, may be a hollow tubular section of an electrically non-conductive composite ceramic substrate such as aluminum oxide toughened zirconia, partially stabilized zirconia, or various glass-ceramic compositions. Alternatively the core substrate, 304, may be composite mixtures of electrically non-conductive ceramic phases such as $Al_2O_3$ or MgO and ceramic phases with relatively. high thermal conductivities including AlN, SiC, TiC, HfC, $B_4C$, $Ta_2C$, ZrC, $Cr_3C_2$, WC, VC, TiB, $TiB_2$, $ZrB_2$, $Mo_2B$, MoB, $Mo_2B_5$, $TaB_2$, $HfB_2$, $AlB_2$, $MoSi_2$, $ZrSi_2$, $Ti_5Si_3$, TiSi, $TiSi_2$ and other metal-carbides, borides, and silicides. Alternatively, the core substrate, 304, may be composed of naturally porous composite materials such as mixtures of diatomaceous earth and kaolin clay. Alternatively the core substrate, 304, may be an electrically non-conductive ceramic. fiber ceramic composite (CFCC) such as a ceramic metal oxide matrix reinforced with $Al_2O_3$ or SiC fibers. Alternatively, the electrically non-conductive core substrate, 304, may also be a nitride-based material with high thermal conductivity such as AlN, TiN, BN, TaN, or NbN. Electrically conductive metals, intermetallics, cermets, and metal-carbides, borides, and silicides may also be used as core substrates, 304, in this invention if a layer of silica or other electrically non-conductive material is applied or deposited on the core substrate to electrically isolate the cermet heating element, 302. The tubular heating element is particularly useful for rapidly heating flowing water, liquid chemicals, air and other gases, including more chemically aggressive species that attack and rapidly corrode metallic heating elements or surfaces. Very fast thermal response times, higher operating temperatures, and excellent thermal efficiencies can be achieved with the present invention because the cermet heating material can be in direct contact with flowing liquids, chemicals or gases. According to the present invention, the tubular cermet heating elements of FIG. 3 are a substantial improvement over conventional wire wound and thick film elements that are commonly used in numerous types of hot air tools for high speed poly sealing, high speed heat shrink installations, ink drying, paper pulp drying, textile cutting and drying, plastic welding, forming, soldering and curing glues or heat activated adhesives. Apart from compactness and energy savings, the laminated tape cermet heaters confer several other significant advantages. For example, the laminated tape heaters can be located in areas that are not easily accessible to coil heaters, such as in the immediate vicinity of a mold gate or medical catheter.

Figure 4:
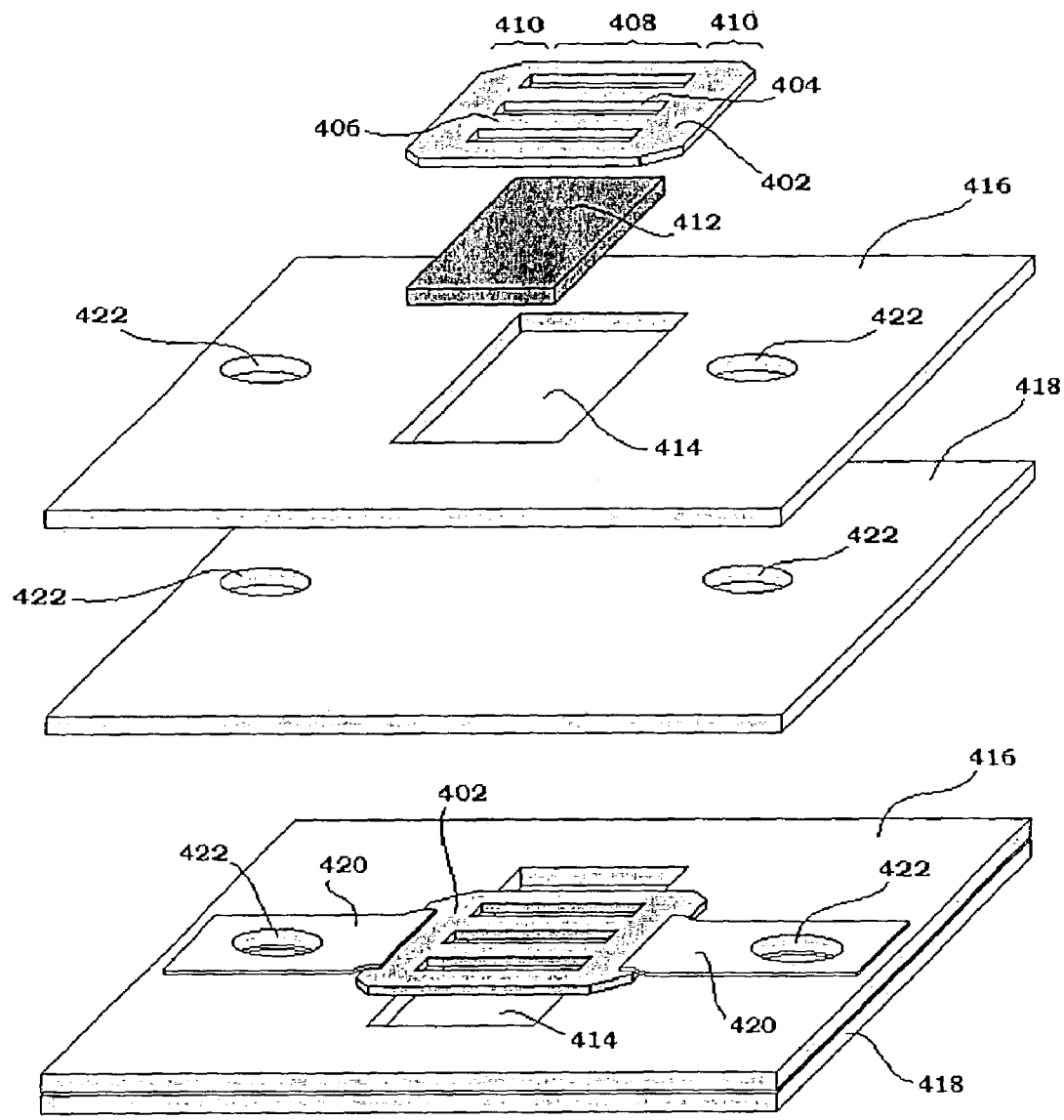
FIG. 4 is a partially-exploded perspective view illustrating a preferred method of suspending a resistive heating element over a cavity or recess that serves to thermally isolate the heating element and thus minimize the power usage and response time of the element, in accordance with the present invention.

FIG. 4 shows a preferred method of suspending a resistive heating element over a cavity or recess that serves to thermally isolate the heating element, and thus minimize the power usage and response time of the heater. A tape or sheet of the as-cast "green" cermet resistive heating material, 402, may be punched, machined or perforated to form alternating axial apertures, 404, and segments of heating material, 406, in the central portion, 408, of the sheet or tape. End zones, 410, of a desired length at opposite extremes of the sheet or tape element are not perforated. After the sintering process, the electrical resistance of the un-perforated end zones, 410, will be much less than the perforated central zone, 408, because the average transverse cross-sectional area of cermet heating material in the perforated central zone is much smaller. When an electrical current is made to flow through the perforated central zone, 408, by applying an electrical potential to the un-perforated ends, 410, most of the electrical power is dissipated in the higher resistance perforated central zone, 408. The central perforated or "hot zone", 408, reaches much higher operating temperatures compared with the un-perforated ends or "cold zones", 410, because much more power ($=I^2R$) is dissipated as a result of the higher average electrical resistance in the central perforated zone. Any geometric shapes that result in restricted zones of lower average transverse cross-sectional area of cermet heating material with respect to end or terminal zones with higher transverse cross-sectional areas are considered part of this invention. For example, a solid (un-perforated) layer of cermet heating material in the shape of an "hourglass" will result in a resistive heating element with higher resistance and power dissipation in the narrower middle section or "hot zone", and lower resistance and power dissipation along the enlarged end zones or "cold zones". In order to prevent slumping or deformation of the cermet heating element, 402, thermally fugitive carbon tapes are fabricated according to the present invention, punched or machined to the desired shape, 412, and then inserted into matching apertures, 414, pre-punched or machined into co-planar tape cast sheets, 416, before co-lamination and sintering of the multilayer tape stack takes place. The cermet heating element, 402, is laminated so that it bridges the cavity or recess filled with the thermally fugitive carbon tape insert. During the high temperature sintering process the furnace atmosphere may be neutral or just slightly oxidizing. It is theorized that the reaction or gasification of the carbon insert with oxygen to form oxides of carbon is slow, and little carbon is lost before the suspended laminate (cermet resistive heating element) begins to sintering and become relatively rigid so that the suspended laminate does not deform or slump significantly into the recess. Additionally, the exothermic combustion of the carbon insert in an oxidizing atmosphere may release a surge of heat that helps to partially sinter the suspended laminate and prevent slumping. Substrate layers, 416 and 418, may be composite mixtures of electrically non-conductive ceramic phases such as $Al_2O_3$ or MgO and ceramic phases with relatively high thermal conductivities including AlN, SiC, TiC, HfC, $B_4C$, $Ta_2C$, ZrC, $Cr_3C_2$, WC, VC, TiB, $TiB_2$, $ZrB_2$, $Mo_2B$, MoB, $Mo_2B_5$, $TaB_2$, HfB2, $AlB_2$, $MoSi_2$, $ZrSi_2$, $Ti_5Si_3$, TiSi, $TiSi_2$ and other, metal-carbides, borides, and silicides. Alternatively, substrate layers, 416 and 418, may be an electrically non-conductive ceramic oxide such as $Al_2O_3$, $ZrO_2$, MgO, cordierite, fused silica (quartz), borosilicate glass, spinel, or the substrate layers may be electrically non-conductive composite ceramics such as aluminum oxide toughened zirconia, partially stabilized zirconia, or various glass-ceramic compositions. Alternatively the electrically non-conductive substrate layers, 416 and 418, may be a ceramic fiber ceramic composite (CFCC) such as a ceramic metal oxide matrix reinforced with $Al_2O_3$ or SiC fibers. The electrically non-conductive substrate layers, 416 and 418, may also be a nitride-based material with high thermal conductivity such as AlN, TiN, BN, TaN, or NbN. Electrically conductive metals, intermetallics, cermets, or metal-carbides, borides, and silicides may also be used as substrate layers, 416 or 418, if a layer of silica or other electrically non-conductive material is applied or deposited on the substrate layers to electrically isolate the cermet heating element, 402. An electro-conductive metallic paste, such as Ag or Pd/Ag, may (optionally) be applied to the low temperature "cold zones" at the ends, 410, of the heating element to lower contact resistance and improve electrical connections. Conductive metallic contacts or clamps, 420, may be readily printed, deposited or attached to the low resistance, "cold zones" at the ends, 410, of the heating element. Holes, 422, may be pre-punched or machined into the substrate layers to act as anchors for securing conductive metallic clamps, 420, with terminal bolts or solder points. The thermally isolated cermet heating element, as shown in FIG. 4 is particularly useful as an energy efficient emitter of infrared radiation. It is known that metals with clean, un-oxidized surfaces have spectral emissivities of only about 0.3 or less and are not efficient infrared energy radiators compared to the cermet heating materials of this invention that may that have spectral emissivites above 0.85. The thermally isolated cermet heating element, as shown in FIG. 4, is also useful as a sensor platform for devices (such as gas analyzers) that require fast thermal response times, and for portable instruments that require low power usage levels.

Figure 5A:
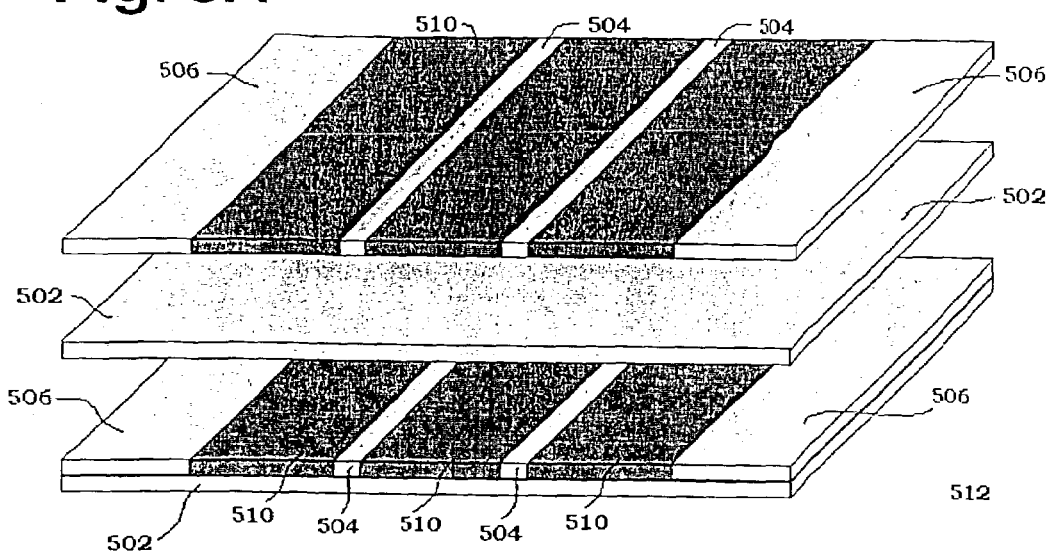
FIG. 5A is a partially-exploded perspective view illustrating a tri-layer "green" or pre-fired laminate assembly.
Figure 5B:
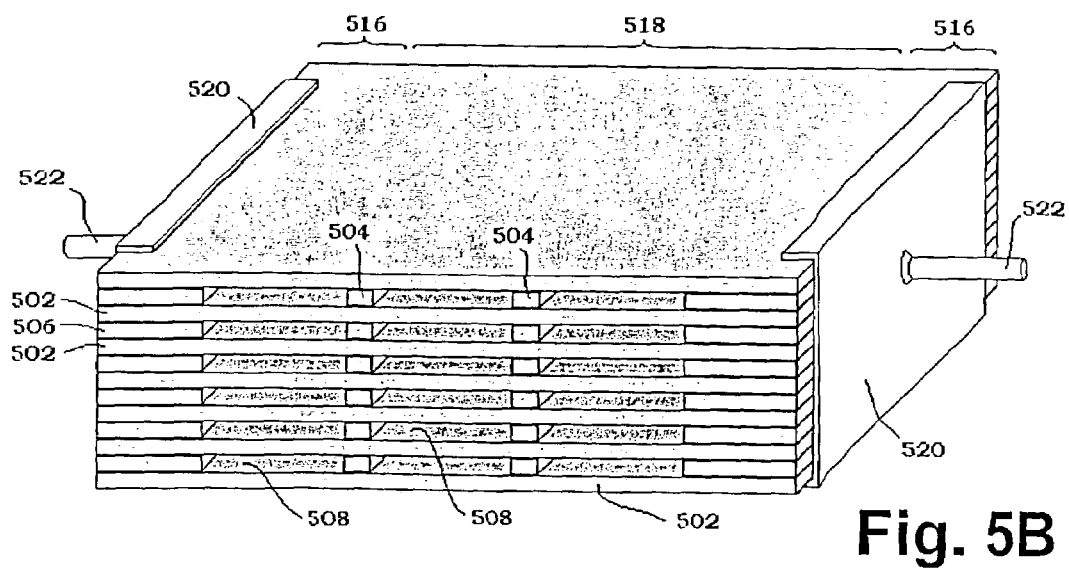
FIG. 5B is a laminate assembly that has been fired and made into a cermet device.

FIGS. 5A and 5B illustrates the construction of an internally heated, microchannel filter made by laminating multiple tapecast layers of cermet heating material and fugitive carbon inserts. FIG. 5A presents a tri-layer "green" preheated assembly. FIG. 5B presents 13-layer cermet laminate device after firing and attachment of electrical conductors that was made from a "green" pre-heated laminate assembly made in a repetitive manner similar to the tri-layer "green" assembly of FIG. 5B.

Preferably, a repetitive lamination process is used to fabricate the microchannel filter monolith. The lamination sequence begins with a base layer of the cermet resistive heating material 502 as shown in FIG. 5A. Inner channel support strips 504 made of tapecast cermet material, and co-planar channel edge strips 506 made of the cermet heating material are then laminated to the base layer 502 to form the vertical walls of the microchannels 508. Thermally fugitive carbon tape inserts 510 are inserted between channel strips 504 and 506 to act as supports that prevent deformation that can occur during pressure laminating and slumping that can occur later when sintering of the multilayer tape stack takes place. A layer of tapecast cermet heating material 502 is then laminated next in the sequence to form the upper channel wall, and the base layer for the next array of microchannels. In one preferred embodiment of the invention, a number of the tapecast cermet heating layers 502 may be replaced by composite mixtures of electrically non-conductive ceramic phases such as $Al_2O_3$, $ZrO_2$, $Si_3N_4$, or AlN and ceramic phases with relatively high electrical conductivities including SiC, TiC, HfC, $B_4C$, $Ta_2C$, ZrC, $Cr_3C_2$, WC, VC, TiB, $TiB_2$, $ZrB_2$, $Mo_2B$, MoB, $Mo_2B_5$, $TaB_2$, $HfB_2$, $AlB_2$, $MoSi_2$, $ZrSi_2$, $Ti_5Si_3$, $TiSi$, $TiSi_2$ and other metal-carbides, borides, and silicides. Alternatively, a number of the tapecast cermet heating layers, 502 and 506, may be replaced with an electrically non-conductive ceramic material such as AlN, $Si_3N_4$, $Al_2O_3$, $ZrO_2$, MgO, cordierite, fused silica (quartz), borosilicate glass, spinel, or electrically non-conductive composite ceramics such as aluminum oxide toughened zirconia, partially stabilized zirconia, or various glass-ceramic compositions. Alternatively the tapecast cermet layers, 502 and 506, may be replaced with a ceramic fiber ceramic composite (CFCC) such as a ceramic matrix reinforced with $Al_2O_3$ or SiC fibers. According to the present invention, as-cast "green" layers of cermet heating materials can be co-laminated with similar or dissimilar structural material layers by applying light mechanical pressure (typically under 1000 psi) and/or low heat (about 75 C). Multilayer stacks of laminated tapes are then co-fired to produce micro channel filter monoliths. During the high temperature sintering process the furnace atmosphere may be neutral or just slightly oxidizing. It is theorized that the reaction or gasification of the carbon insert with oxygen to form oxides of carbon is slow, and little carbon is lost before the suspended laminates begin to sinter and become relatively rigid so that the suspended laminates do not deform or slump significantly into microchannel cavities, 508. Additionally, the exothermic combustion of the carbon inserts, 510, in an oxidizing atmosphere may release a surge of heat that helps to partially sinter the suspended laminate and prevent slumping and deformation.

As shown in FIG. 5B, after the sintering process, the electrical resistance of the solid end zones 516 will be much less than the central microchannel zone 518 because the average transverse cross-sectional material area of the solid end zones 516 is much larger compared to the central microchannel zone 518. When an electrical current is made to flow through the central microchannel zone 518 by applying an electrical potential across opposite faces of the solid end zones 516 most of the electrical power is dissipated in the higher resistance central microchannel zone 518. The central microchannel "hot zone" 518 reaches much higher operating temperatures compared with the solid end zones or "cold zones" 516 because much more power ($=I^2R$) is dissipated as a result of the higher average electrical resistance in the central microchannel "hot zone" 518. Any perforation or stacking patterns that result in central microchannel zones, 518 with a lower average transverse cross-sectional area of cermet heating material, (and therefore zones of higher resistance and power dissipation) with respect to solid end zones 516 are considered part of this invention. After sintering, an electro-conductive metallic paste, such as Pd/Ag, may (optionally) be applied to the solid end zones 516 of the microchannel filter monolith to improve electrical contact between the vertical layers of cermet resistive heating materials and conductive metallic contact plates or end clamps 520. As shown in FIG. 5B, conventional metallic lead wires 522 for supplying electrical current can be welded or soldered to metallic contact plates or end clamps 520. Fast thermal response times, higher operating temperatures, and excellent thermal heat transfer efficiencies can be achieved with the present invention because the cermet heating elements are in direct intimate contact with gases, particulates or liquid chemicals flowing through the microchannel structure. Thermally regenerative oxidation systems and high temperature microchannel filters have many environmentally important applications that include the thermal oxidation (neutralization) of toxic exhaust gases, carbon soot and particulates in diesel engines or coal-fired power plants, as well as the destruction or neutralization of pollutants such as volatile organic compounds (VOCs) and solvents.

The carbon black strips provide structural stability of the "green" assembly, and when fired, directly sublimate into CO2 gas without deforming, cracking, slumping, or shrinking of the resulting cermet that is fused onto the structure or substrate or across a void of a substrate. Additionally, the carbon strips are functionally compatible with other tapes and tape casting slurries that make it possible to easily co-laminate, and even simultaneously cast carbon black based slurries with other ceramic based slurries.

Figure 6:
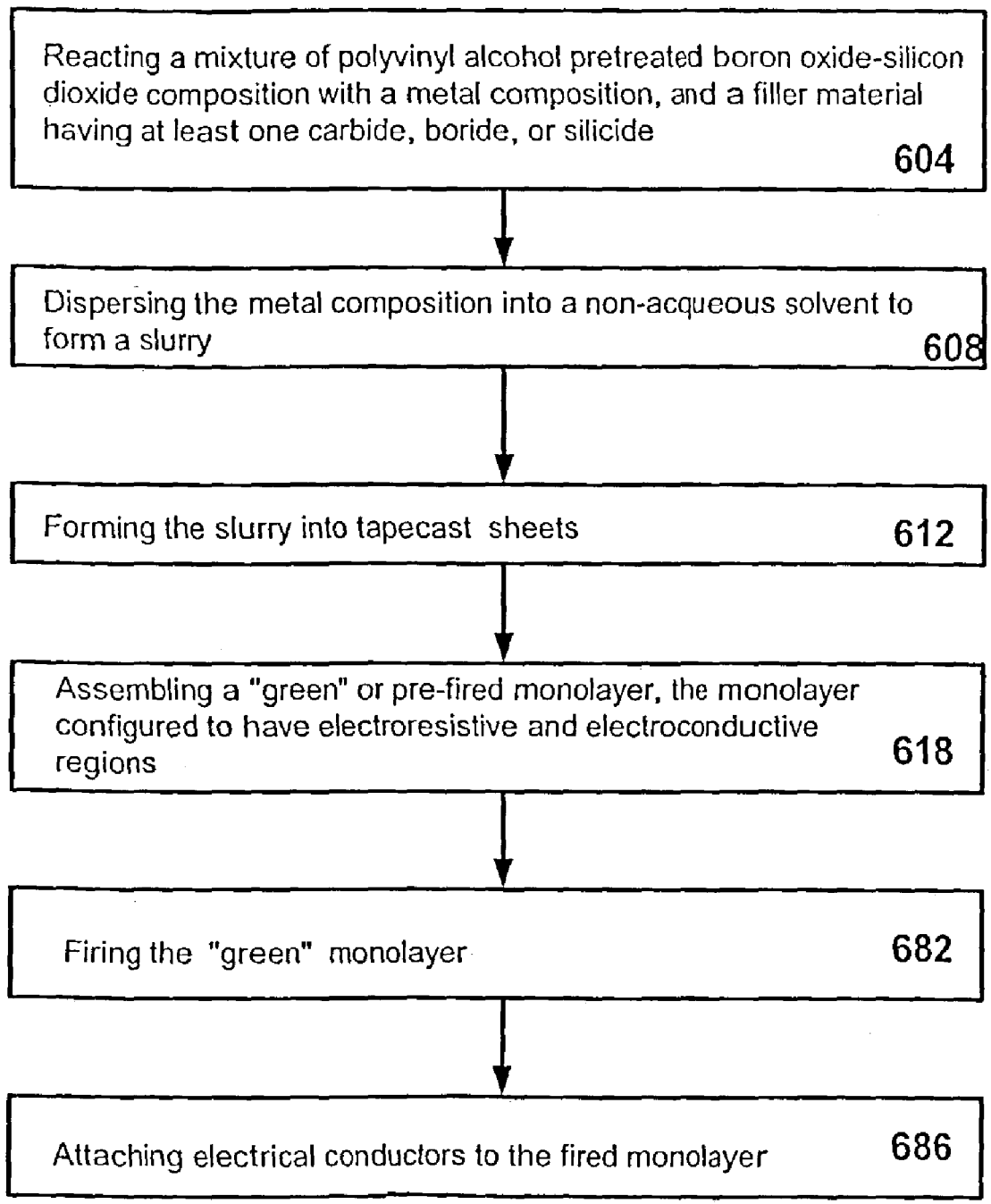
FIG. 6 is a method flow chart of preparing a cermet monolayer device.

FIG. 6 is a method flow chart of preparing a cermet monolayer device substantially as illustrated in FIG. 1, and begins with step 604 wherein the reaction of a mixture of polyvinyl alcohol treated boron oxide-silicon dioxide composition with a metal, a filler material, and thermally fugitive carbon-based material first occurs, followed by step 608 where the reacted metal composition is dispersed into a non-acqueous solvent to form a reacted metal composition cermet-based slurry. Thereafter, in step 612, the slurry is formed into tapecast electro-conductive sheets. In step 618, a "green" or pre-fired cermet monolayer is configured to have electro-resistive and electro-conductive regions. The electro-resistive regions can be made by casting restrictions into the monolayer, cutting restrictions into the monolayer, or cutting perforations in the monolayer. Electro-conductive reagions of the monolayer is made by applying a metallic residue near the ends of the monolayer. Thereafter, in step 682, the "green" monolayer is fired or heated to establish fusion. Finally, in Step 686, electrical conductors are attached to the electro-conductive regions.

FIG. 7 is a method flow chart of preparing a cermet bi-layer laminate device substantially as illustrated in FIG. 2 and begins with step 704 wherein the reaction of a mixture of polyvinyl alcohol treated boron oxide-silicon dioxide composition with a metal, a filler material, and thermally fugitive carbon-based material first occurs, followed by step 708 where the reacted metal composition is dispersed into a non-acqueous solvent to form a reacted metal composition cermet-based slurry. Thereafter, in step 712, the slurry is formed into tapecast electro-conductive sheets. In step 718, a "green" or pre-fired cermet monolayer is configured to have electro-resistive and electro-conductive regions and is applied onto a structure or substrate. The electro-resistive regions can be made by casting restrictions into the cremate monolayer, cutting restrictions into the monolayer, or cutting perforations in the monolayer. Electro-conductive reagions of the monolayer and underlying structure is made by applying a metallic residue near the ends of the monolayer and structure. Thereafter, in step 782, the "green" bi-layer laminate is fired or heated to establish fusion. Finally, in Step 786, electrical conductors are attached to the electro-conductive regions of the monolayer and structure.

Figure 8:
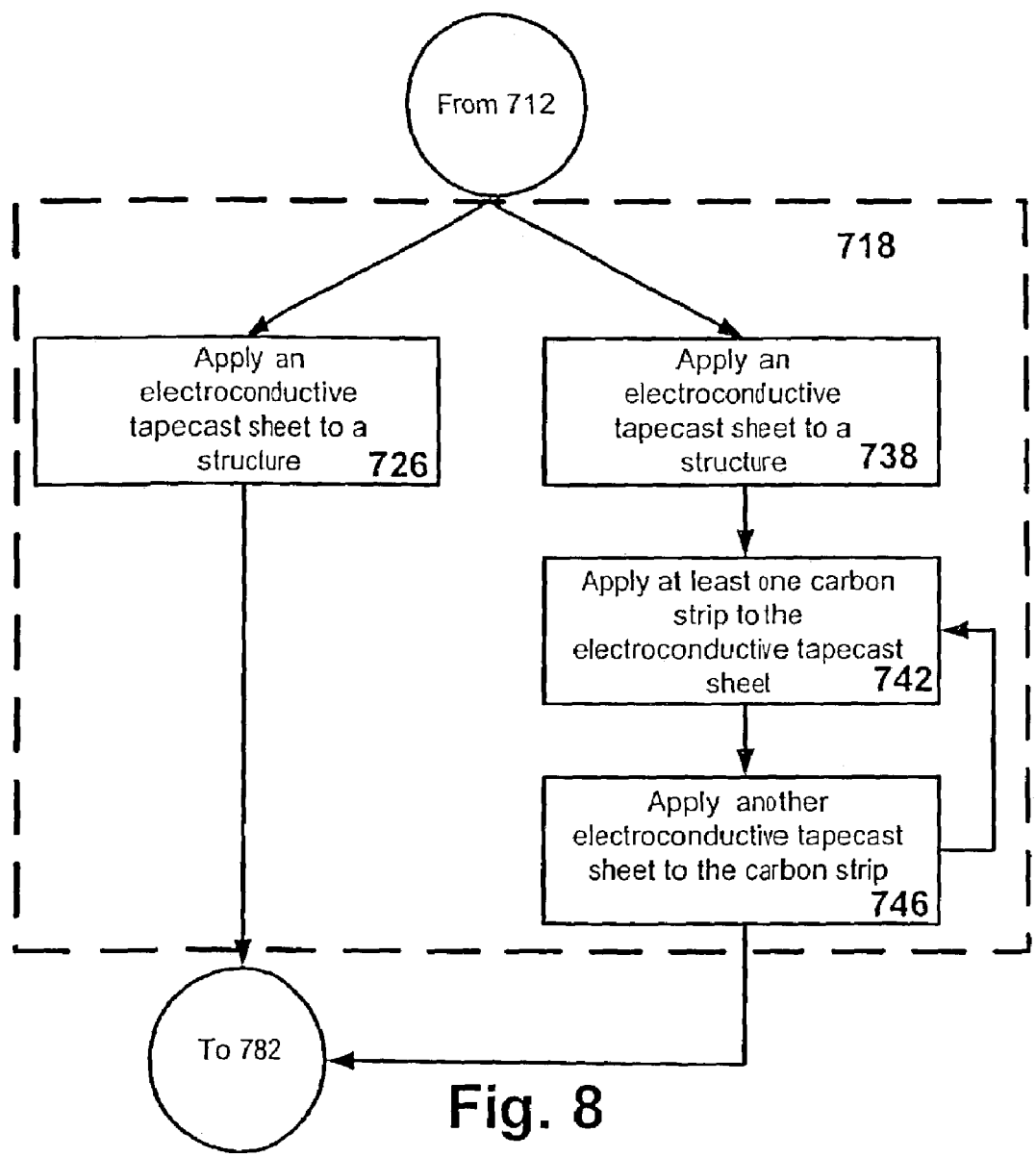
FIG. 8 is an expansion of the method flow chart of FIG. 7 for preparing single layer laminates on structures not having voids from pre-fired assemblies not stabilized with carbon strips, single layer laminates made from pre-fired assemblies stabilized with carbon strips, and multi-layer laminates made from pre-fired assemblies stabilized with carbon strips.

FIG. 8 is an expansion of the method flow chart of FIG. 7 for preparing single layer laminates on structures not having voids from pre-fired assemblies not stabilized with carbon strips, single layer laminates made from pre-fired assemblies stabilized with carbon strips, and multi-layer laminates made from pre-fired assemblies stabilized with carbon strips, as illustrated in FIGS. 5A and 5B. In one case, as shown in step 726, the electro-conductive tapecast sheet is applied to the structure and then routed to step 782 for firing. In another case, after the electro-conductive tapecast sheet to the structure in step 738, at least one carbon strip is applied to the tapecast sheet as shown in step 742. This is followed, in step 746, by another electro-conductive tapecast sheet that is applied over the carbon strip. At this point, the carbon strip stabilized "green" laminate can be sent to step 782 for firing, or, cycle back to steps 742 and 746 to build up desired multi-layer "green" laminate assemblies for subsequent firing in step 782.

Figure 9:
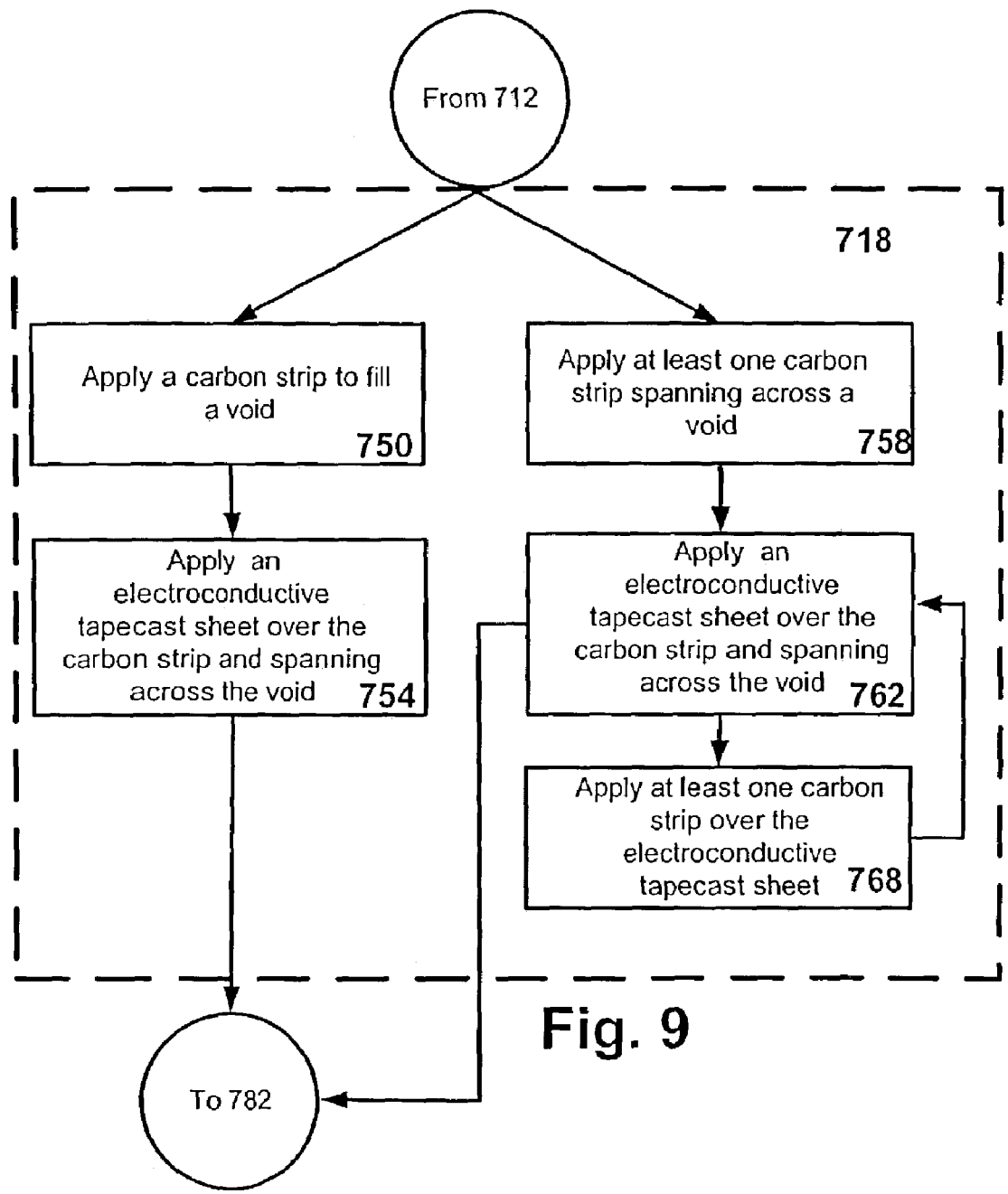
FIG. 9 is an expansion of the method flow chart of FIG. 7 for preparing single layer laminates over structures with a void from pre-fired assemblies stabilized with carbon strips filling the void, single layer laminates made from pre-fired assemblies stabilized with carbon strips spanning the void, and multi-layer laminates made from pre-fired assemblies stabilized with carbon strips spanning the void.

FIG. 9 is an expansion of the method flow chart of FIG. 7 for preparing single layer laminates over structures with a void from pre-fired assemblies stabilized with carbon strips filling the void, single layer laminates made from pre-fired assemblies stabilized with carbon strips spanning the void, as illustrated in FIG. 4, and multi-layer laminates made from pre-fired assemblies stabilized with carbon strips spanning the void. In one case, as shown in step 750, a carbon strip is applied to fill a void in the structure. Thereafter, as shown in step 754, the electro-conductive tapecast sheet is applied over the carbon strip and spans across the void, then to routed to step 782 for firing. In another case, bridge-like structures are made, as described in step 758, by applying at least one carbon strip to span across the void. Thereafter, as described in step 762, an electro-conductive tapecast sheet is applied over the carbon strip and similarly spans across the void. At this juncture, a single cermet "green" monolayer that is stabilized by an under supporting carbon strip proceeds to step 782 for firing. Alternatively, another carbon strip, as described in step 768, is applied over the electro-conductive tapecast sheet, then cycled back to step 762 for receiving another electro-conductive tapecast sheet. Steps 762 and 768 are repeated as required until the desired multi-layer carbon strip stabilized "green' laminate is built-up over the void. Thereafter, the built-up multi-layer "green" laminate assembly for subsequent firing in step 782.

The metallo-thermic reaction involving Aluminum, boron oxide-silicon dioxide compositions as previously described is conducted in ambient atmosphere. The Aluminum and Aluminum alloys may compositions may be conducted under inert atmospheres provided by Nitrogen, Helium, or Argon. Similarly, metallo-thermic reactions involving metal and metal alloys other than aluminum may also be conducted under inert atmospheres provided by Nitrogen, Helium, or Argon whenever oxygen-based atmospheres prove unsuitable for non-Aluminum metals and non-Aluminum metal alloys.

While the preferred embodiment of the invention has been illustrated and described, as noted above, many changes can be made without departing from the spirit and scope of the invention. Accordingly, the scope of the invention is not limited by the disclosure of the preferred embodiment.

I claim:

1. A composition for a metal-ceramic, the composition comprising:
    an aluminum based composition;
    a boron oxide-silicon dioxide composition pre-treated with a polyvinyl alcohol solution;
    a filler material being selected from the group consisting of carbide, boride, and silicide; and
    a thermally fugitive material.

2. The composition of claim 1, wherein the aluminum base composition includes Aluminum metal.

3. The composition of claim 1, wherein the Al is powder having a size of approximately −100 mesh or less.

4. The composition of claim 1, wherein the filler materials are metal-based filler materials and include Ni.

5. The composition of claim 4, wherein the filler materials further include a material selected from the group consisting of: borides of Ni and Fe; silicides of Mo and Ti, and carbides of Ti and Si.

6. The composition of claim 1, wherein filler materials are nonmetal-based, the nonmetal-based filler materials selected from the group consisting of B and Si.

7. The composition of claim 6, wherein the nonmetal-based filler materials further includes silicides of B, carbides of B, or combinations thereof.

8. The composition of claim 1, wherein the filler materials are ternary compositions, the ternary composition including carbides of Ti and Si compounds, carbides of Ti and Al compounds, and carbides of Ti and Ge compounds.

9. The composition of claim 1, wherein the thermal fugitive material is selected from the group consisting of plasticizers, binders, deflocculants, defoamers, surfactants, and solvents.

10. The composition of claim 1, wherein boron oxide-silicon dioxide composition is a composition including $B_2O_3$ being present at a weight percentage of 13%.

11. The composition of claim 1, wherein the composition for the metal-ceramic includes a stochiometric ratio of Aluminum to $B_2O_3$ that varies from about 2:1 to about 4:1, and a stochiometric ratio of $B_2O_3$ to filler materials that varies from about 0.4:1 to about 9:1.

* * * * *

UNITED STATES PATENT AND TRADEMARK OFFICE
CERTIFICATE OF CORRECTION

PATENT NO. : 7,189,342 B2
APPLICATION NO. : 10/435398
DATED : March 13, 2007
INVENTOR(S) : Lucian G. Ferguson It is certified that error appears in the above-identified patent and that said Letters Patent is hereby corrected as shown below:

Column 7,
Line, 42, change "due" to --do--.

Column 11
Line 17, change "LTOC" to --LTCC"--.

Column 11
Line 67, after "Cr" change ";" to --,--.

Column 12
Line 17, change "Defoarmer)" to --Defoamer)--.

Column 18,
Line 41, change "spinet." to --spinel.--.

Column 19
Line 1, change "bepunched" to -- be punched--.

Column 22
Line 32, delete the second "that" after the word "may…".

Column 24
Line 6, change "CO2" to --$CO_2$--.

Column 24
Line 27, change "reagions" to --regions--.

Column 24
Line 48, change "reagions" to --regions--.

Column 25
Line 34, After the word "The" insert --metallo-thermic reactions involving--

UNITED STATES PATENT AND TRADEMARK OFFICE
CERTIFICATE OF CORRECTION

PATENT NO. : 7,189,342 B2
APPLICATION NO. : 10/435398
DATED : March 13, 2007
INVENTOR(S) : Lucian G. Ferguson It is certified that error appears in the above-identified patent and that said Letters Patent is hereby corrected as shown below:

Column 25
Line 35, Delete the words "may compositions"

Signed and Sealed this

Seventh Day of August, 2007

JON W. DUDAS
*Director of the United States Patent and Trademark Office*